(12) United States Patent
Noth et al.

(10) Patent No.: US 10,974,878 B2
(45) Date of Patent: Apr. 13, 2021

(54) CONTAINER CAP ASSEMBLY

(71) Applicant: NESTEC S.A., Vevey (CH)

(72) Inventors: Andre Noth, Pully (CH); Alexandre Kollep, Lutry (CH); Damien Neurohr, Bramois (CH); Etienne Claude Jaquier, Oron-la-Ville (CH)

(73) Assignee: Societe des Produits Nestle S.A., Vevey (CH)

( * ) Notice: Subject to any disclaimer, the term of this patent is extended or adjusted under 35 U.S.C. 154(b) by 94 days.

(21) Appl. No.: 16/333,697

(22) PCT Filed: Sep. 14, 2017

(86) PCT No.: PCT/EP2017/073084
§ 371 (c)(1),
(2) Date: Mar. 15, 2019

(87) PCT Pub. No.: WO2018/054748
PCT Pub. Date: Mar. 29, 2018

(65) Prior Publication Data
US 2019/0270555 A1 Sep. 5, 2019

(30) Foreign Application Priority Data
Sep. 20, 2016 (EP) .................................... 16189662

(51) Int. Cl.
*B65D 1/02* (2006.01)
*B65D 47/20* (2006.01)
(Continued)

(52) U.S. Cl.
CPC ............. *B65D 47/265* (2013.01); *A23G 9/22* (2013.01); *A23G 9/28* (2013.01); *B65D 1/0292* (2013.01);
(Continued)

(58) Field of Classification Search
CPC .... B65D 47/265; B65D 85/78; B65D 1/0292; B65D 47/2062; B65D 51/224; B65D 85/72; B65D 2203/06; A23G 9/22; A23G 9/28
See application file for complete search history.

(56) References Cited

U.S. PATENT DOCUMENTS 6,477,743 B1 * 11/2002 Gross ................... B65D 47/244
222/212
10,740,583 B2 * 8/2020 Noth ................ G06K 19/06168
(Continued)

FOREIGN PATENT DOCUMENTS

| CN | 1807200 A | 7/2006 |
| CN | 201520469 U | 7/2010 |
| WO | 2015063135 | 5/2015 |

OTHER PUBLICATIONS

English Translation of Chinese Office Action for Chinese Patent Appl No. 201780056016.6 dated Apr. 13, 2020.

*Primary Examiner* — Frederick C Nicolas
(74) *Attorney, Agent, or Firm* — K&L Gates LLP

(57) ABSTRACT

A cap assembly is used in a container. A food product to be dispensed from the container is in an inner volume of the container, and the inner volume of the container is closed by a lid. An identifier is arranged on the cap assembly and/or on a surface of the container. The cap assembly includes two parts relatively moveable with respect to each other in a relative movement. The relative movement and/or a solidary movement of these two parts allows displacement of the identifier according to a certain path and allows opening and/or closing a communication between the cap assembly and the inner volume of the container.

16 Claims, 25 Drawing Sheets

(51) Int. Cl.
*B65D 47/26* (2006.01)
*B65D 51/22* (2006.01)
*B65D 85/72* (2006.01)
*A23G 9/28* (2006.01)
*A23G 9/22* (2006.01)
*B65D 85/78* (2006.01)

(52) U.S. Cl.
CPC ....... *B65D 47/2062* (2013.01); *B65D 51/224* (2013.01); *B65D 85/72* (2013.01); *B65D 85/78* (2013.01); *B65D 2203/06* (2013.01)

(56) References Cited

U.S. PATENT DOCUMENTS

| | | |
|---|---|---|
| 2006/0071000 A1 | 4/2006 | Weist et al. |
| 2013/0064937 A1 | 3/2013 | Jarisch et al. |
| 2015/0158665 A1* | 6/2015 | Kruger ............... A47J 31/4492 426/112 |
| 2015/0225142 A1 | 8/2015 | Agassi et al. |
| 2015/0250351 A1* | 9/2015 | Yoakim ............... A47J 31/4403 99/295 |
| 2016/0165920 A1 | 6/2016 | Mcgill et al. |
| 2019/0254307 A1* | 8/2019 | Noth ..................... A23G 9/228 |

* cited by examiner

US 10,974,878 B2

CONTAINER CAP ASSEMBLY

CROSS REFERENCE TO RELATED APPLICATIONS

The present application is a National Stage of International Application No. PCT/EP2017/073084, filed on Sep. 14, 2017, which claims priority to European Application No. 16189662.6, filed on Sep. 20, 2016, the entire contents of which are being incorporated herein by reference.

FIELD OF THE INVENTION

The present invention relates to a cap assembly used in containers, allowing the opening of a protective closure over the container and the further dispensing of the content arranged inside such a container. The invention further relates to a container system comprising such a cap assembly.

BACKGROUND OF THE INVENTION

The present invention is particularly related to the field of devices or machines used in the preparation of cold and frozen desserts at home, such as ice-creams, sorbets, whipped yoghourts, smoothies or the like. Typically, for these machines, the initial product comes in a packaging, from where it is dispensed into a receptacle where it is processed, typically by cooling/freezing and/or by stirring so that the product reaches a final temperature, texture and air content, before it is consumed.

The packaging used to contain the initial product is typically aseptically filled and is then sealed with a closure, typically a flexible lid or film. This makes it possible that, once out of the aseptic area, the packaging is sterile and can be kept ambient for long periods (typically, for several months) thanks to light and gas barriers in the packaging.

When used by the end consumer, this packaging has to be opened to deliver the product into the machine or device to allow its preparation. In order to simplify the consumer experience, it would be desirable that this operation is done fully automatically, so the consumer would only be asked to place the container in the machine or device.

Present solutions existing in the state of the art provide containers with closures where all the operations that need to be carried out, such as opening the lid or membrane (typically by piercing), opening and later closing of the container before it is removed from the machine in order to avoid dripping, can be done in a fully automatic way. Moreover, it would be further desirable to read a code in the container comprising the parameters for the process to be carried out in the machine. In order to rationalize the machine and the operations to be carried out, it would be desirable to use the same operation for the opening or closing the packaging and/or piercing it, also for reading or scanning such a code, thus lowering the number of components needed in the machine or device and, as a consequence, the complexity and the price for the consumer.

Furthermore, the packaging needs to comply with further requirements, such as:
  Robustness: the pack should be highly resistant to any hard condition that may happen before the product consumption, be it vibrations, shocks or pressures during transport and storage as well as drops or unintentional wrong manipulations by the consumer.
  Hygiene—before use: the zones of the packaging where residuals or hollow bodies such as dust or insects could stay and end in the product should be extremely limited.
  Hygiene—during use: the product dispensing should occur in a controlled manner directly into the machine or into a processing container.
  Hygiene—after use: even if the initial packaging will be mostly emptied after use, a residual volume of product might remain in it; hence, this packaging should be closed and hermetic to any remaining product at the end of the process, to avoid any product dropping when the packaging is removed from the machine.

As a conclusion, several functions have to be realized, and rather than addressing each of them separately, the aim of the present invention is to provide a system that is able to address them all simultaneously.

OBJECT AND SUMMARY OF THE INVENTION

According to a first aspect, the invention relates to a cap assembly 10 used in a container 20 comprising in its inner volume a food product to be dispensed, the container volume being closed by a lid 21: the cap assembly 10 comprises two parts 11, 12 relatively moveable with respect to each other, such that the relative movement and/or the solidary movement of these two parts 11, 12 allow the following functions: displacement of identification means 22 arranged on the cap assembly 10 and/or on the container surface according to a certain path; opening and/or closing a communication between the cap assembly 10 and the inner volume of the container 20.

Preferably, the relative movement and/or the solidary movement of these two parts 11, 12 further allows the opening of the lid 21. Typically, the opening of the lid 21 is done by peeling, by piercing and/or by tearing.

In one embodiment, the two parts 11, 12 are designed to move solidarily when they move in one direction, being designed to move independently to each other, while moving in the reverse direction. Typically, the two parts 11, 12 are rotatable with respect to each other.

Typically, the cap assembly 10 of the invention further comprises an element designed to engage with an external retention element for disengaging the movements of the two parts of the cap assembly. This element is preferably designed in such a way that allows being engaged with the external retention element when the cap assembly moves in one direction, being left disengaged when the cap assembly moves in the reverse direction.

According to the invention, the engagement of the cap assembly can be performed either constantly by the external retention element or occasionally, either by an active blocking at selected times or passively by a mechanical element.

Preferably, one of the parts in the cap assembly of the invention further comprises a piercing element 125 having a sharp profile, designed to be pressed towards the lid 21 by the relative movement of the two parts, in order to pierce and open this lid.

Typically, the parts comprise one or a plurality of matching ramps and ramp followers, designed to dictate the path to be followed by the two parts when moving relative to each other. The path dictated and followed by the two parts further typically comprises pressing downwards a piercing element 125 onto the lid 21 and/or guiding it to tear open this lid 21.

The cap assembly 10 of the invention preferably comprises an outlet 116 through which the product in the container 20 is dispensed, the outlet having a certain orientation allowing facilitating the dispensing of the product, the relative rotation of the two parts being designed in such a way that, when the communication with the inner volume of the container is opened, the outlet 116 is oriented facilitating the product dispensing.

Furthermore, the cap assembly 10 of the invention typically further comprises additional identification means provided by one or a plurality of obstacles 48 in the travel of the two parts relative to each other, the information content being provided by the torque required to move these two parts and overcome said obstacles.

According to a second aspect, the invention refers to a container system 40 comprising a container 20 comprising a food product inside, and a cap assembly 10 as the one described, through which the food product is dispensed.

In the container system of the invention, the container 20 is designed being at least partially collapsible, allowing dispensing of the product through the cap assembly 10 when the container is pressed.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF EXEMPLARY EMBODIMENTS

Figure 1:
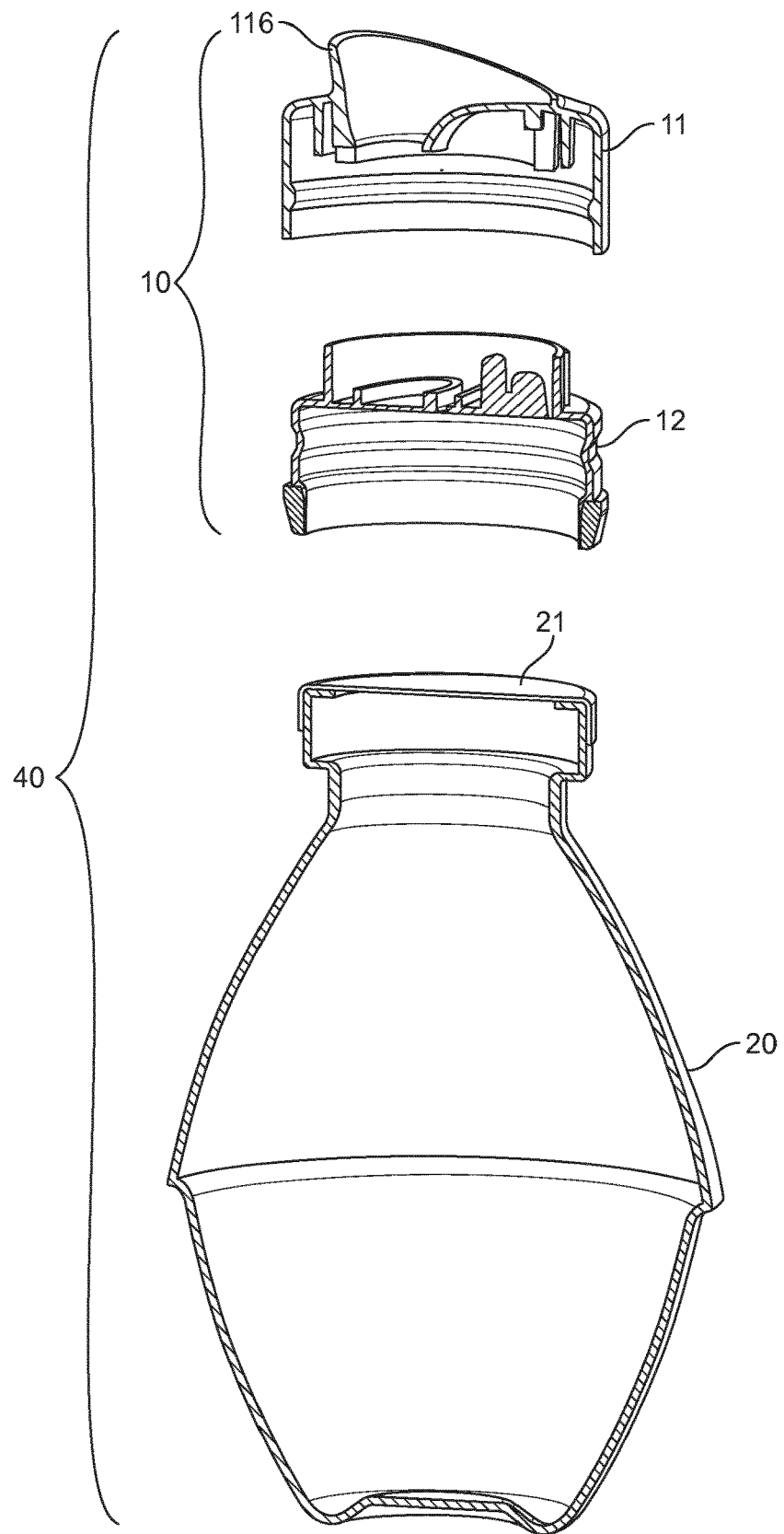
FIG. 1 shows a sectional view of the two parts of the cap assembly according to the invention joined to a container.

The present invention relates to a cap assembly 10 used with a container 20: the container 20 is typically flexible or at least partially flexible, and comprises in its inner volume a food product to be dispensed. The food product dispensed is then processed in a device or machine (typically by being stirred and aerated) in order to prepare a cold or frozen dessert from it, such as an ice-cream, a sorbet, a whipped yoghourt, a smoothie or the like.

The container 20 is aseptically filled with the food product and is then sealed by means of a closure, typically a lid or a film 21, preferably made of aluminum, to preserve the product inside for long storage periods. Then, after the container 20 has been sealed with the lid 21, the cap assembly 10 is arranged over the container's neck. The cap assembly together with the container constitute together a so called container system 40.

The cap assembly 10 of the invention is designed in such a way that, when arranged on a container 20, by applying a rotation to it, one or a plurality of the following functions are provided:

reading of a code that contains information on the product or parameters of the process to be applied for its preparation;

opening/closing a physical channel communicating two parts of the cap, as it will be further explained, so as to communicate with the inner volume of the container;

opening the lid or film closing the container 20 (typically by piercing).

The cap assembly 10 of the invention comprises two parts, moveable with respect to each other, typically rotatable with respect to each other. These parts are a primary part 11 and a secondary part 12. The rotation of these two parts relative to each other or their solidary rotation can provide the functions of code reading and/or opening the lid and opening and/or closing of a physical channel communicating both and the inner volume of the container, as it will be further described.

These parts 11, 12 are typically injected and then assembled by clipping to form the cap assembly 10.

Figure 2:
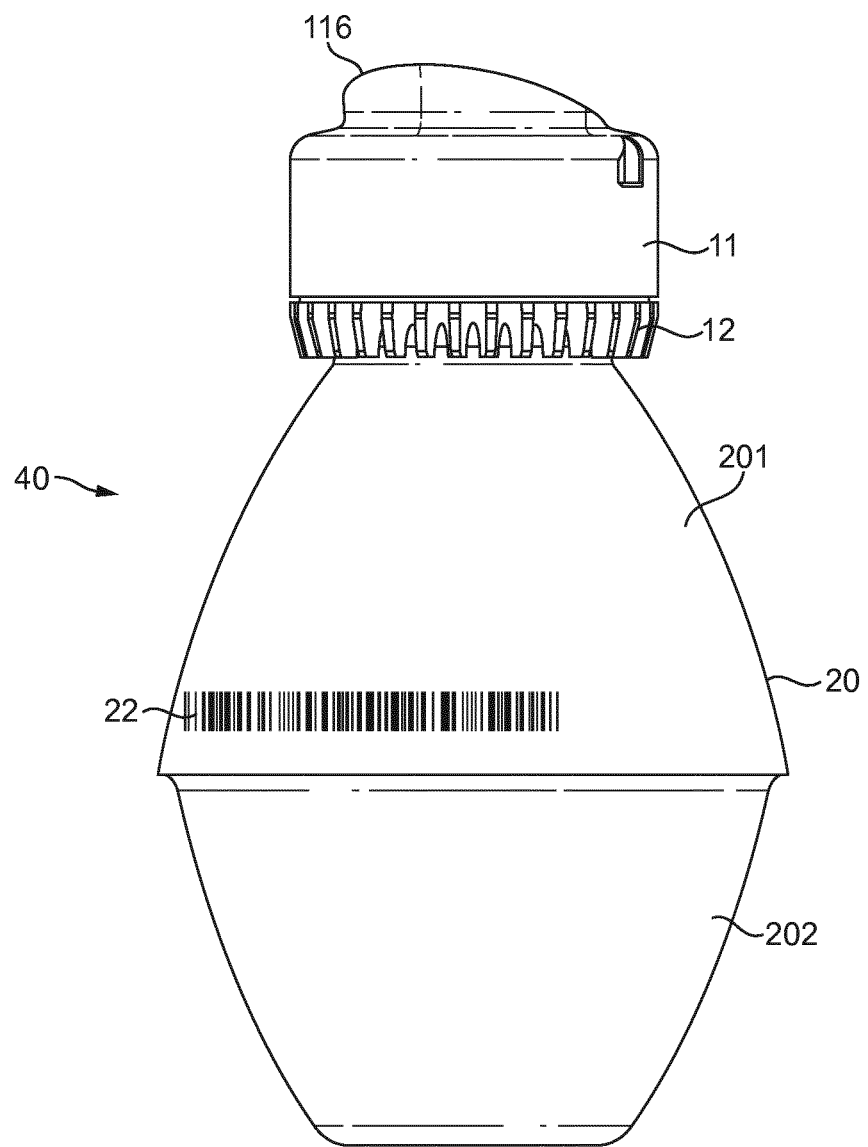
FIG. 2 shows a schematic view of a container system according to the invention.

FIGS. 1 and 2 show the two parts 11, 12 of a cap assembly 10 according to the invention, arranged over the neck of a container 20. The container 20 further comprises identification means 22, preferably optical identification means, such as for example a barcode, a 2D barcode or any optically readable code applied on the container or on the cap assembly, preferably comprising the data of the food product inside and of the processing parameters to follow in a device or machine for its correct preparation. These identification means 22 can also be arranged on the cap assembly 10.

In the Figures attached, the container has been represented as a bottle, though it can also adopt other shapes, such as a flexible pouch, a capsule, a thermoformed container, or the like. Typically, the bottle where the cap assembly 10 is arranged, is a flexible bottle, preferably a partially collapsible bottle, comprising a retaining part 201 and a collapsible part 202. The collapsible part 202 is configured to collapse at least partially inside the retaining part 201 by the application of pressure substantially in a direction of the longitudinal axis of the container. Typically, the collapsible part 202 is configured to collapse by inverting its shape and conforming to substantially the inner shape of the retaining part 201 in order to allow the dispensing of the food product (typically a fluid) inside the container 20.

Figure 3A:
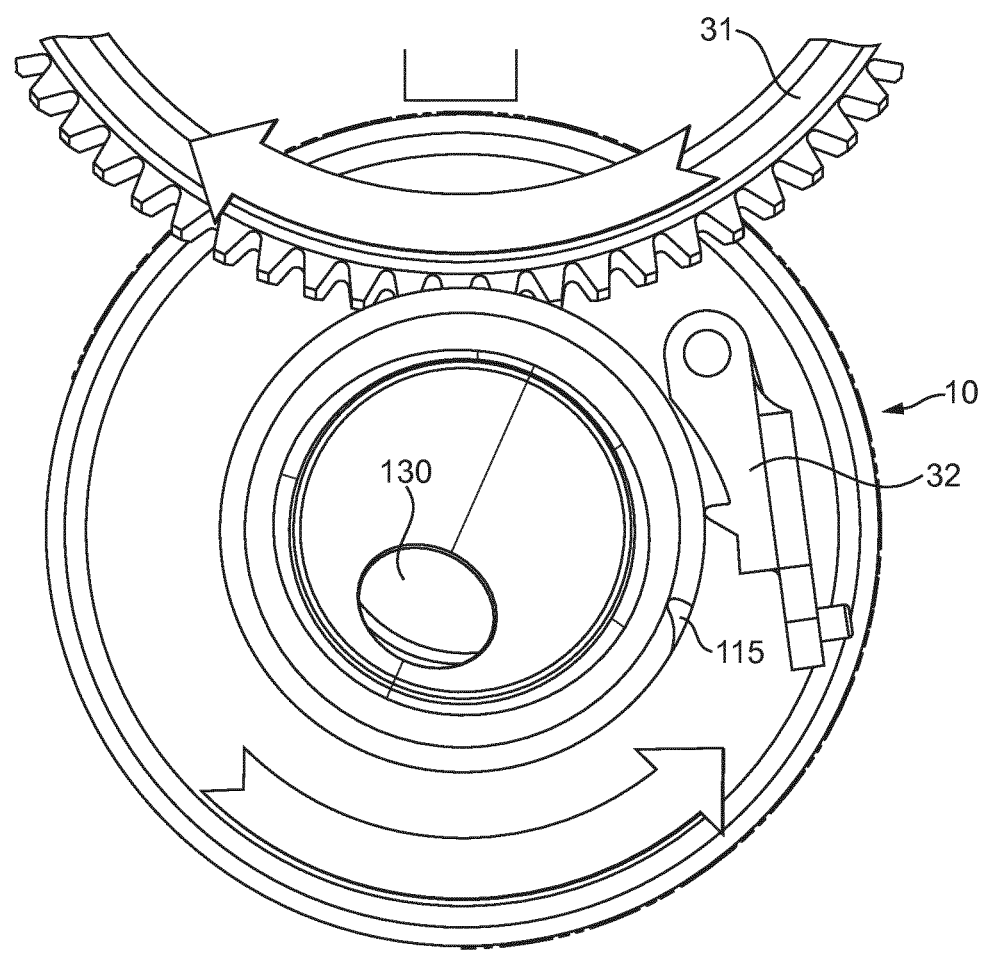
FIGS. 3a-c show various steps in the driving in rotation of a cap assembly according to the present invention.
Figure 3B:
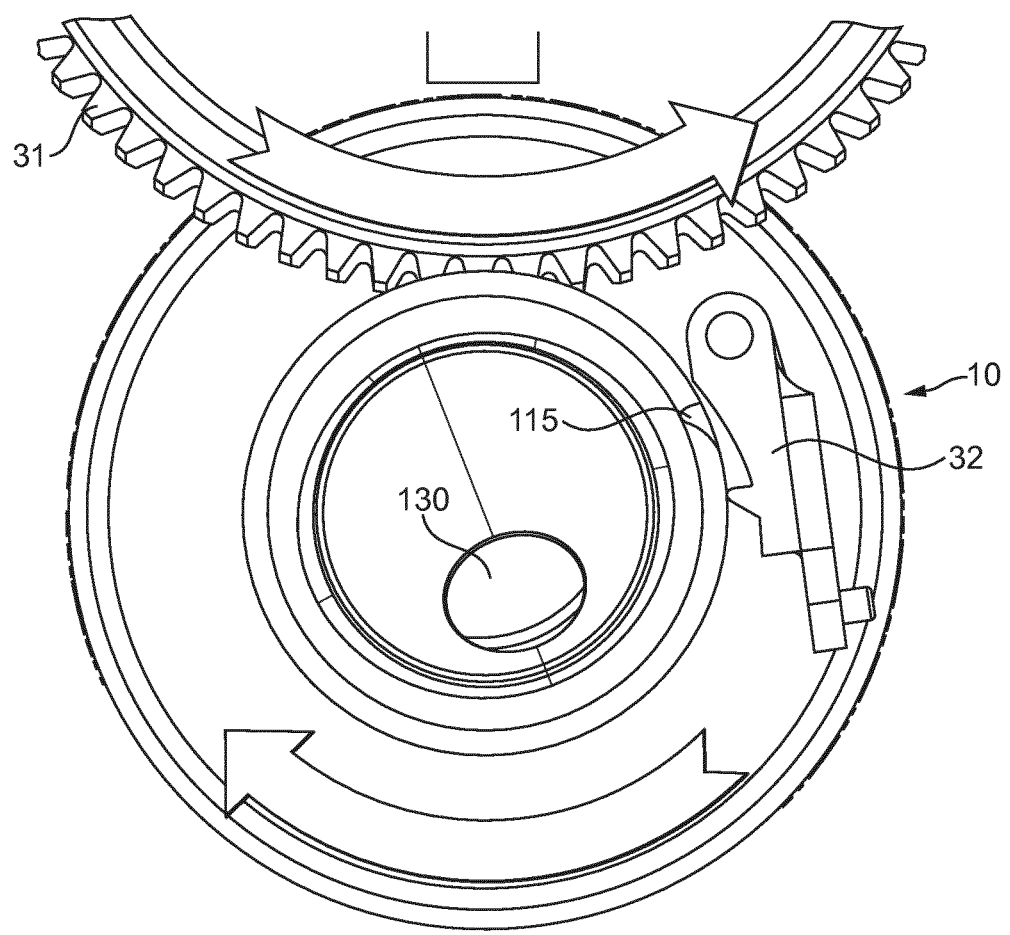
Figure 3C:
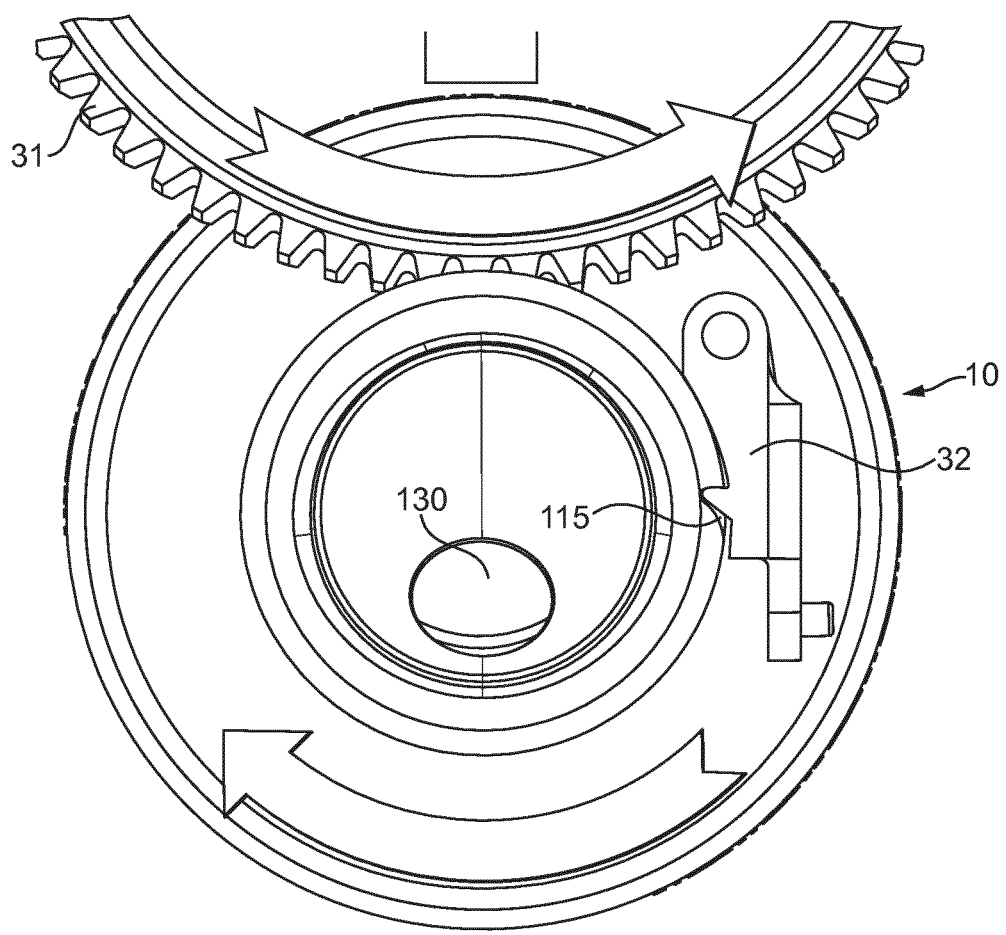

The primary part 11 and the secondary part 12 of the cap assembly 10 and their relative movement is further represented in detail in FIGS. 3*a-c*. A driving element 31 of a preparation machine, typically a gearing element, drives in rotation the secondary part 12 of the cap that will turn accordingly. This rotation will have the following impact in the other parts of the container system 40:

- as the secondary part 12 is attached to the container 20, the container will turn together with this secondary part 12, considering that no other torque is applied on the container; this will allow the scanning of a code 22 typically printed on the container by a sensor 33 placed at a fixed location in the machine;
- as the two parts of the cap assembly are joined together, the cap primary part 11 can either turn simultaneously together with the secondary part 12, when it is left free and has no other torque applied to it, or it can be blocked by a retention element 32 in the machine side engaging with a corresponding groove 115 in this primary part 11, so the secondary part 12 will rotate with respect to the primary part 11 (as the primary part 11 has been blocked or fixed from moving by its groove 115 connecting to the retaining element 32), thus ensuring the functions of: opening and/or closing a physical channel 130 formed between an aperture 110 in the primary part 11 of the cap and an aperture 120 in the secondary part 12 of the cap (appearing once the piercing element 125 has been moved or pushed downwards so an open space is created communicating with the inner volume of the container), the physical channel 130 communicating the cap assembly 10 with the inner volume of the container 20; and opening by piercing the lid 21.

These three functions will be now described in more detail in what follows.

Figure 4:
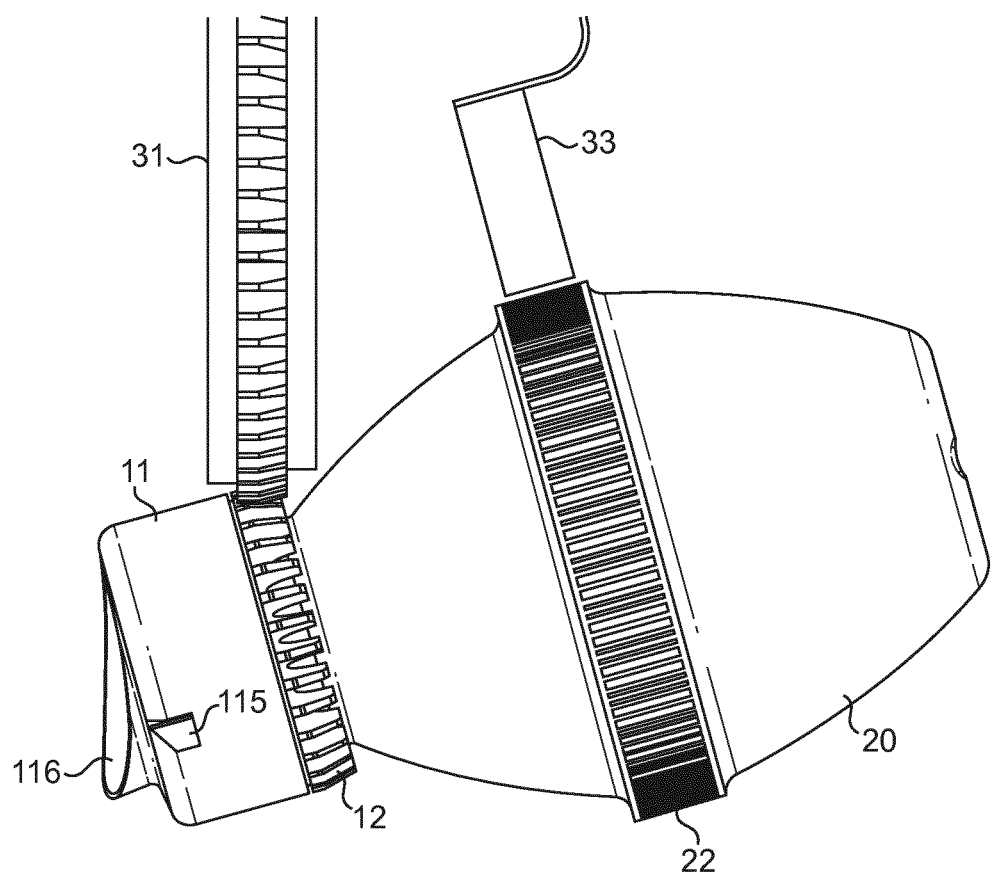
FIG. 4 shows a schematic view of the reading of a code arranged in the container by a sensor in a preparation machine or device, in a system according to the present invention.

As schematically represented in FIG. 4, the rotation of the container 20, induced by the cap secondary part 12 to which it is attached, will make a code 22 printed on the external part of the container 20 travel in front of a sensor 33 fixed in the machine. It is the code 22 that travels in front of the sensor: this removes the need to have a moving sensor system, and allows using a small sensor to cover a large surface of code, in order to have a large quantity of information, so the system is made simpler and less costly.

The function of opening the lid 21 is done preferably by a piercing element 125, typically arranged on the lower side part of the secondary part 12 of the cap. This piercing element 125 is typically a flexible sub-part of the secondary part 12 of the cap, as represented on FIG. 5 or 6. Typically, this piercing element 125 is linked to the rest of the secondary part 12 by a thin part of plastic that acts as a hinge. As a consequence, under a certain force, the piercing element 125 will rotate and be pushed downwards onto the lid 21: as the lid 21 is located very close below the piercing element 125, it will consequently be pierced during this operation. Besides, In order to initiate the piercing, the piercing element 125 is designed with sharp tips or ends.

Figure 5:
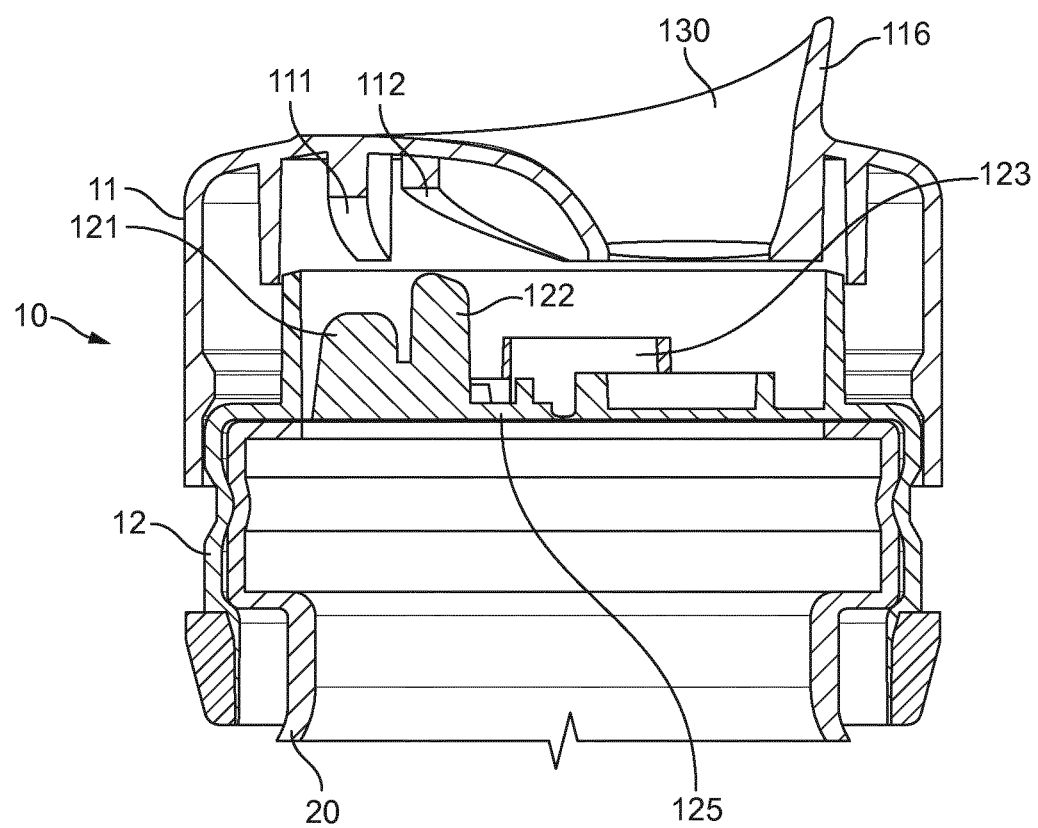
FIG. 5 shows a sectional view of the main elements forming the two parts of the cap assembly according to the present invention, showing a position where the two parts are not mounted yet, for better understanding their components.
Figure 6:
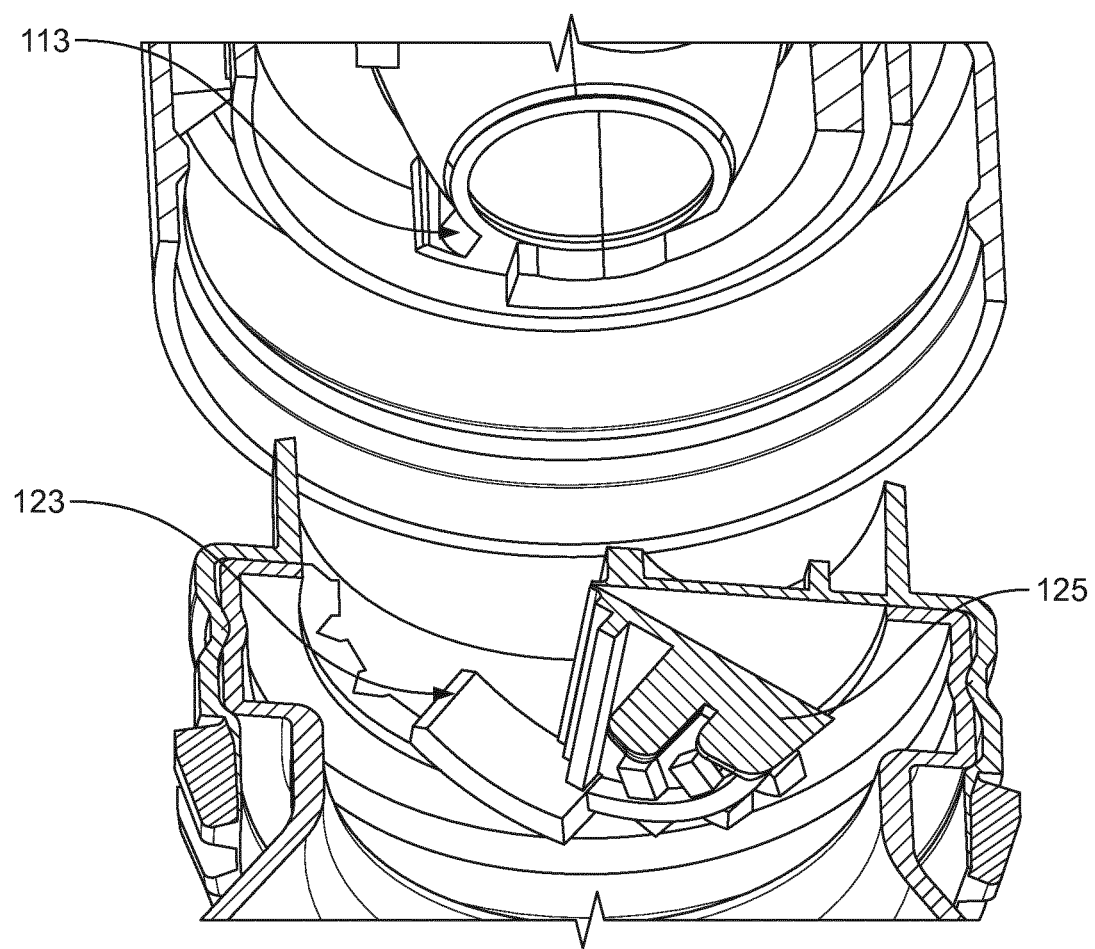
FIG. 6 shows representative views of the two parts configuring a cap assembly according to the present invention.
Figure 7A:
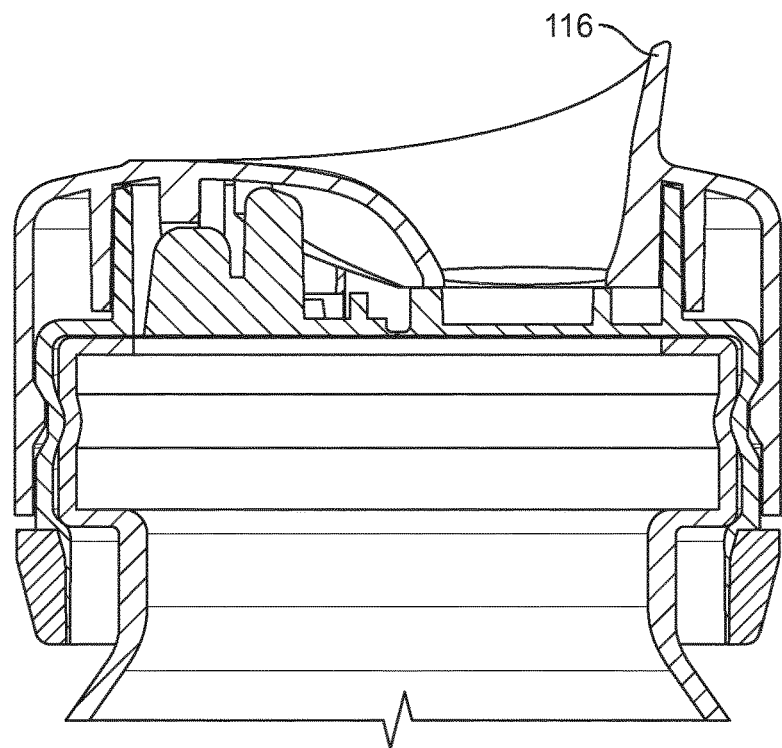
FIGS. 7a-j show different representative views of the two parts configuring a cap assembly according to the present invention, showing different steps in the piercing of the lid arranged on the container.
Figure 7B:
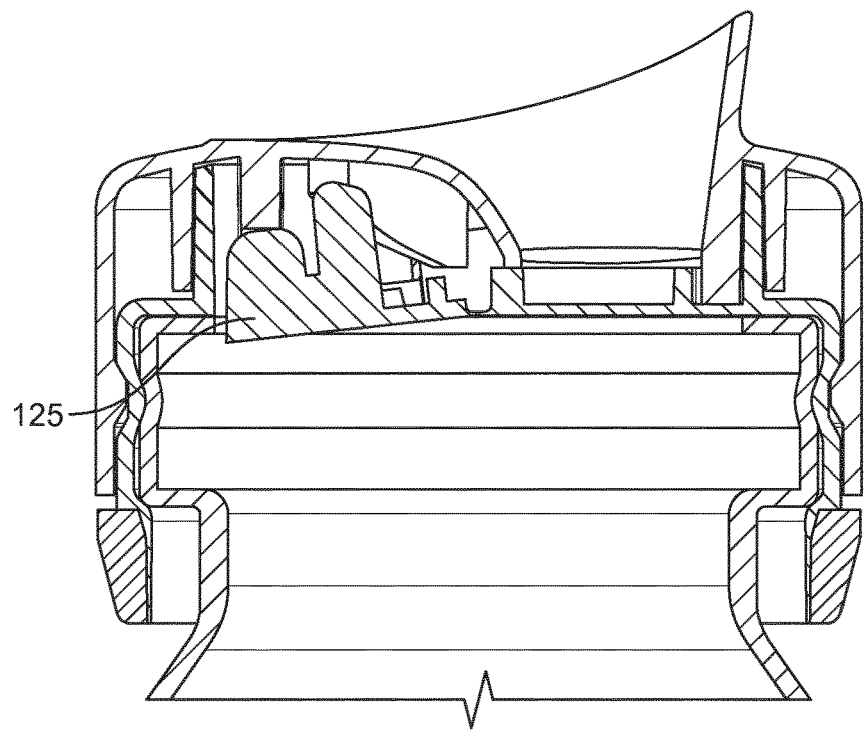
Figure 7C:
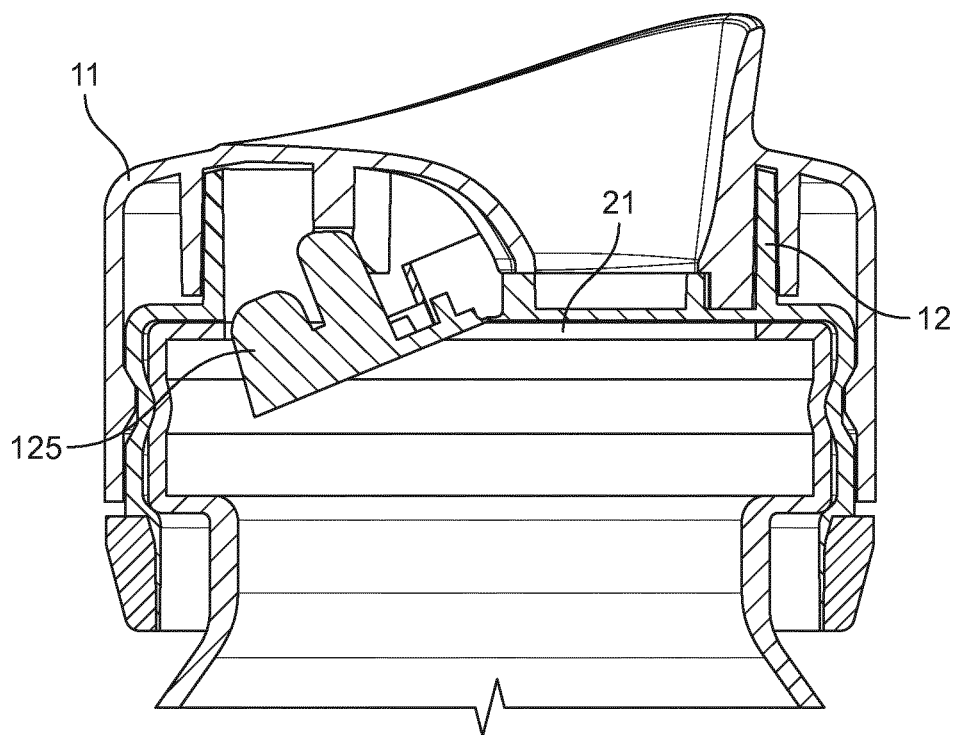
Figure 7D:
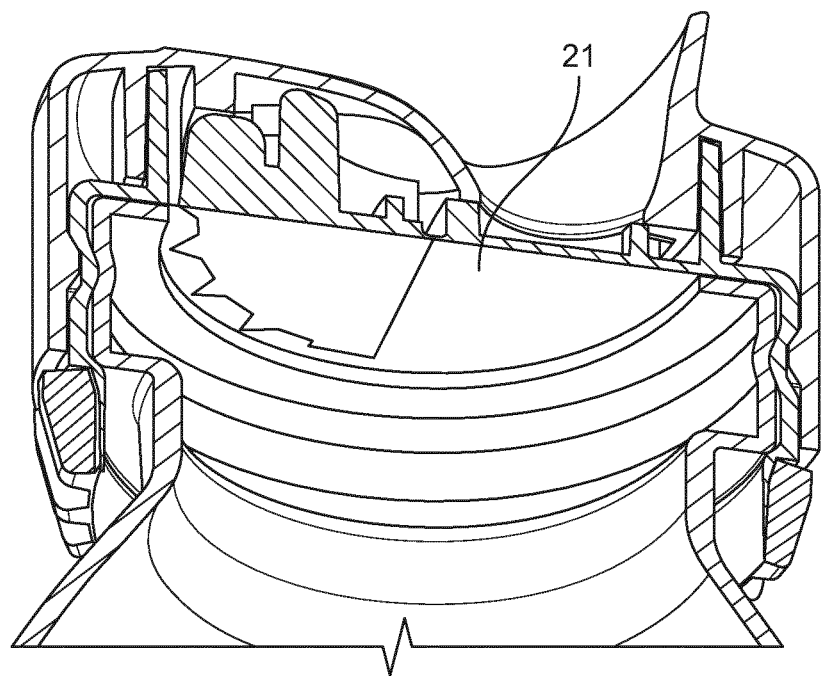
Figure 7E:
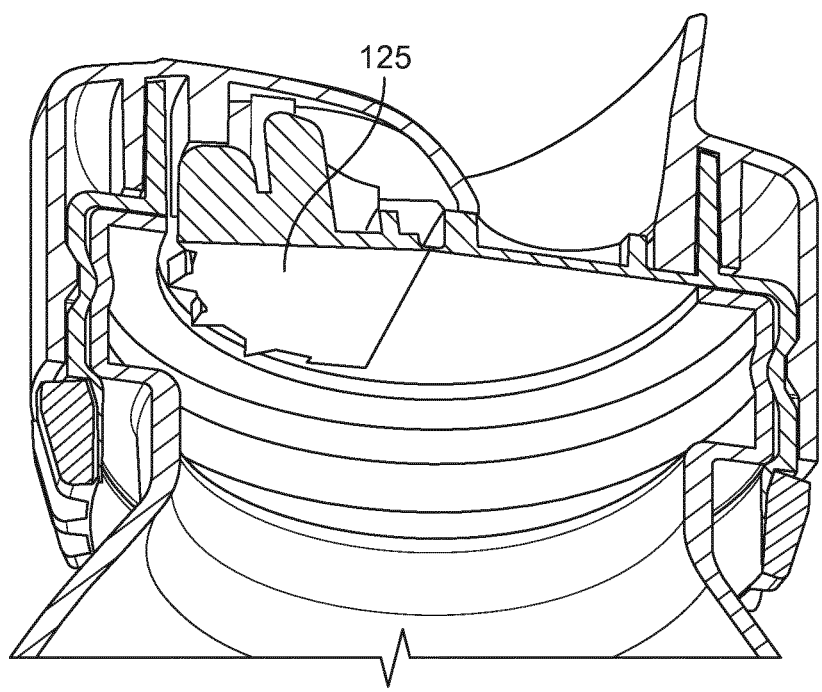
Figure 7F:
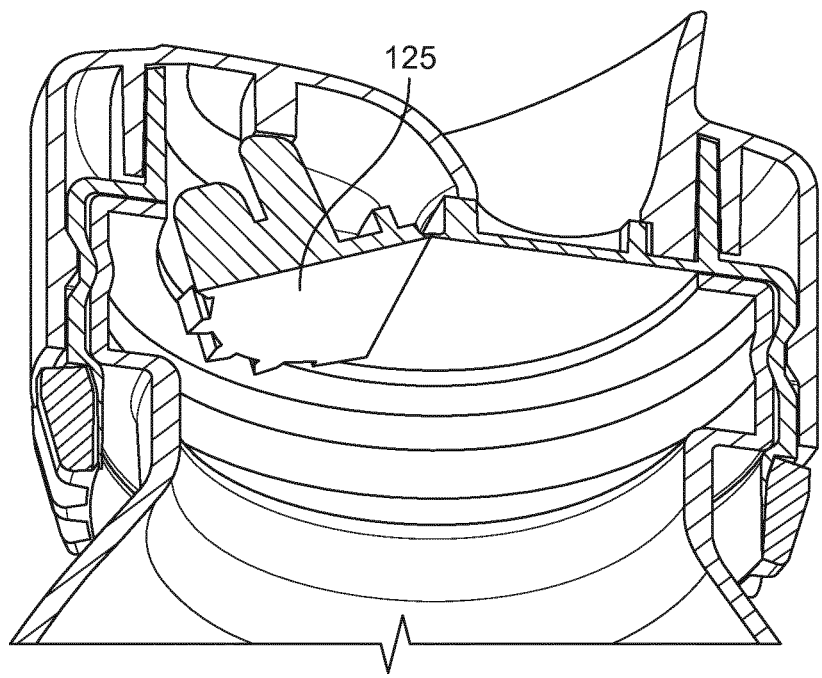
Figure 7G:
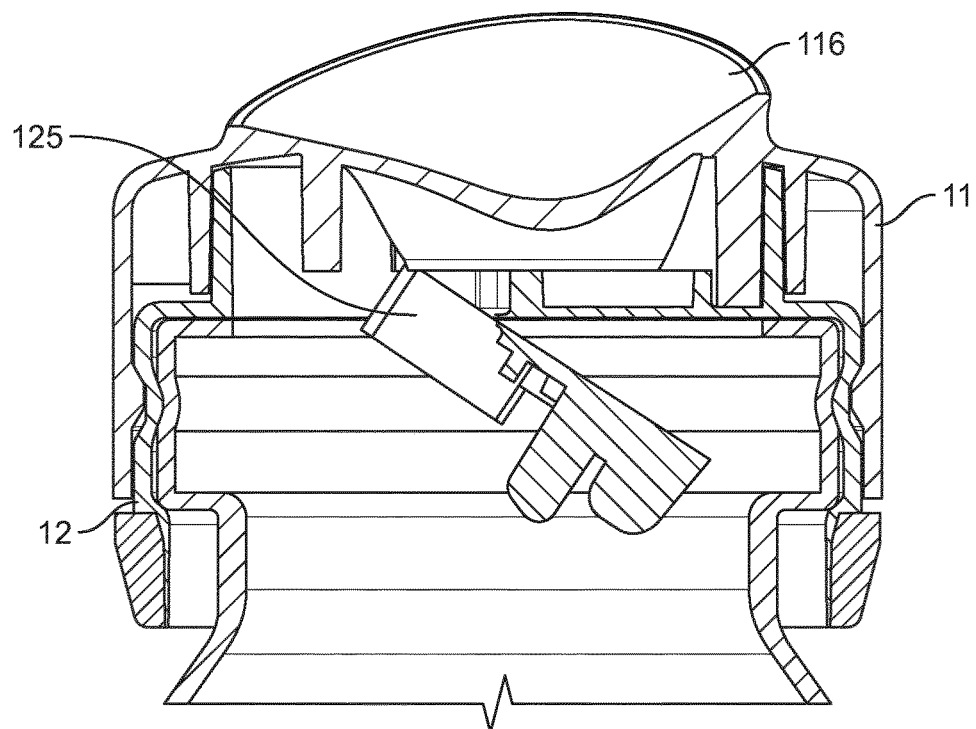
Figure 7H:
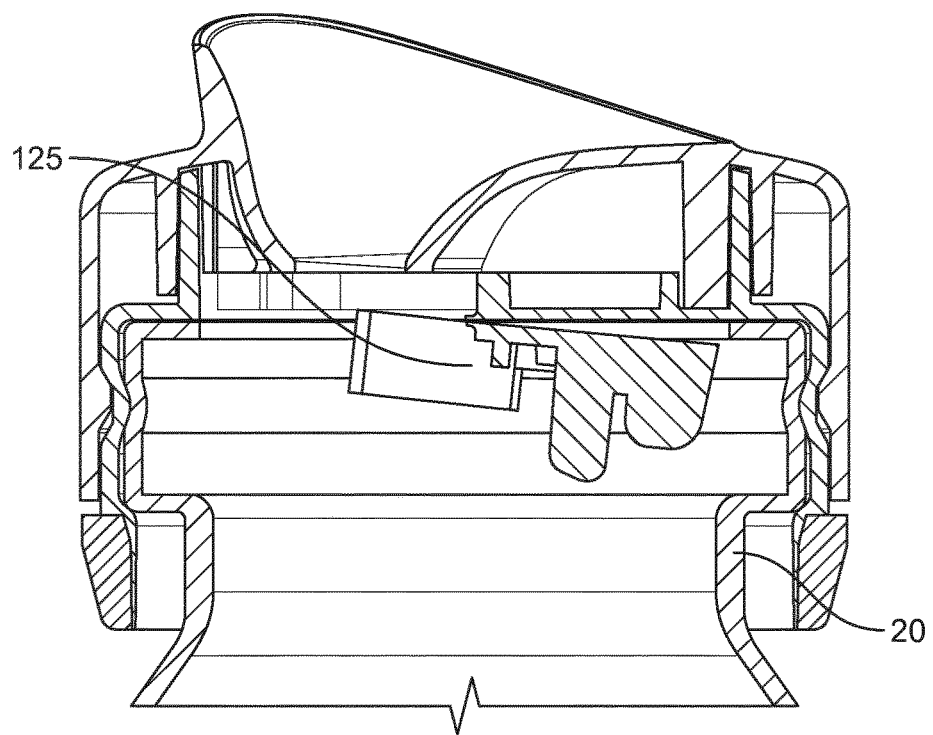
Figure 7I:
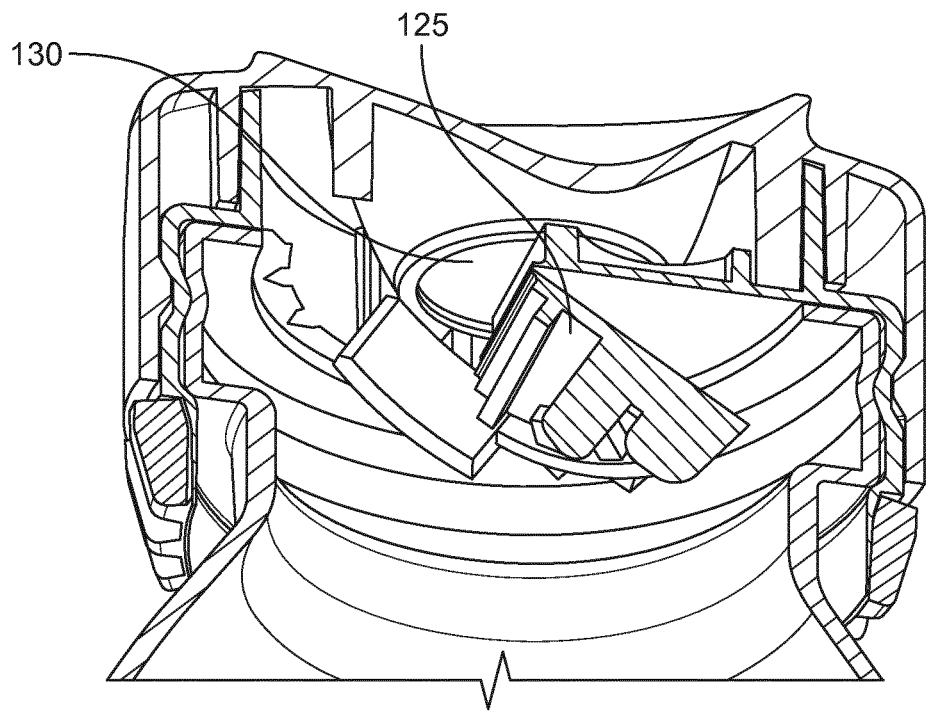
Figure 7J:
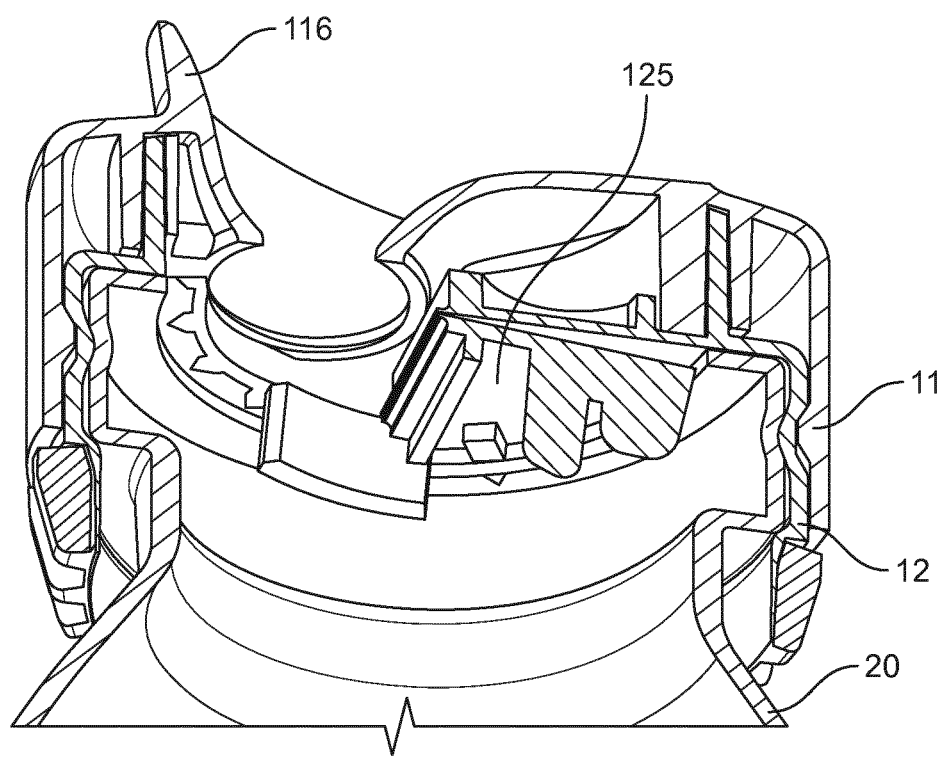

The actuation itself is done by one or more ramps and complementary ramp followers arranged on the primary part 11 and on the secondary part 12 of the cap assembly 10, respectively. Typically, as represented in FIGS. 5 and 6, the primary part 11 of the cap comprises two ramps, a primary ramp 111 and a secondary ramp 112, though other configurations are also possible. Matchingly, the secondary part 12 of the cap comprises corresponding ramp followers, typically a primary ramp follower 121 and a secondary ramp follower 122. With such configuration, the primary and secondary parts 11, 12 will slide on each other and will sequentially induce the forces needed to push the piercing element 125 downwards so as to pierce the lid 21, opening it to allow dispensing of the product inside the container 20. Therefore, the matching ramps and ramp followers dictate the path to follow for the movement of the primary and secondary parts relative to each other. This movement is shown in different several consecutive steps in attached FIGS. 7*a-j*. The rotation of the two parts of the cap with respect to each other is preferably further guided with a tertiary ramp 113 in the primary part 11 of the cap and a corresponding matching tertiary ramp follower 123 in the secondary part 12 of the cap.

Figure 8C:
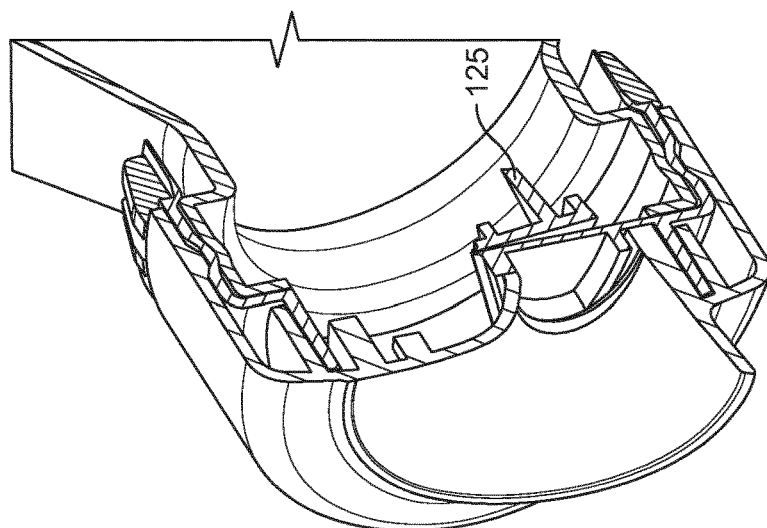
FIGS. 8a-c show sectional views of the two parts of the cap assembly according to the invention, showing different steps for the opening and/or closing of a product channel.
Figure 8B:
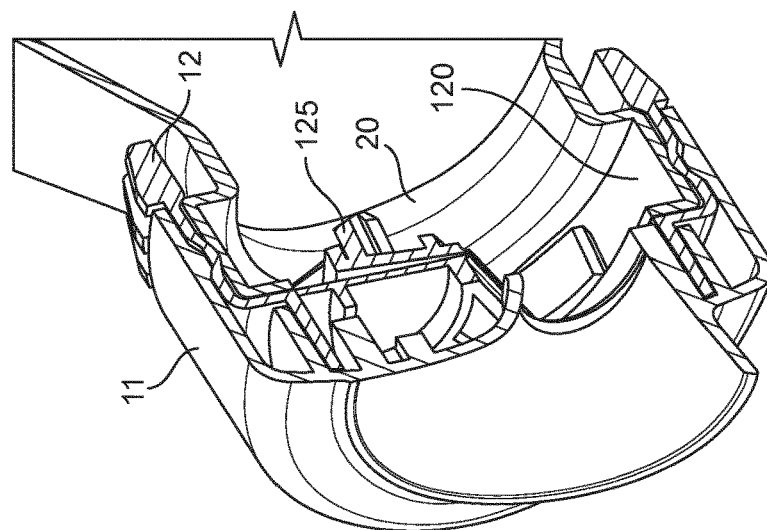
Figure 8A:
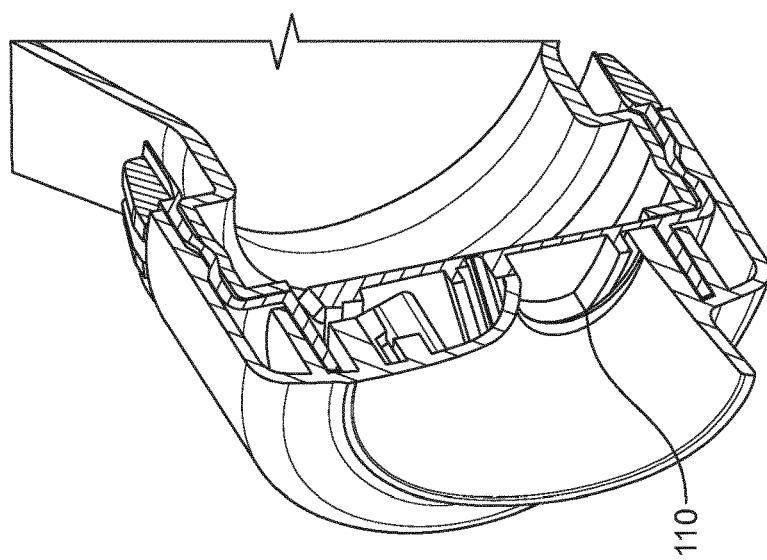

The function of opening and closing the product channel 130 is done by making a correspondence or not between the two apertures or openings 110, 120 in the primary and secondary parts 11, 12 respectively, during the travel of these two parts with respect to each other. This can be seen in FIGS. 8*a-c*, for example. In fact, it is the piercing element 125, when being pushed downwards, therefore removing the material closing the communication of the secondary part 12 with the inside of the container 20, which creates the aperture 120 that will match with the aperture 110 in the primary part 11 of the cap assembly. This is a preferred configuration, though others would also be possible.

Figure 9:
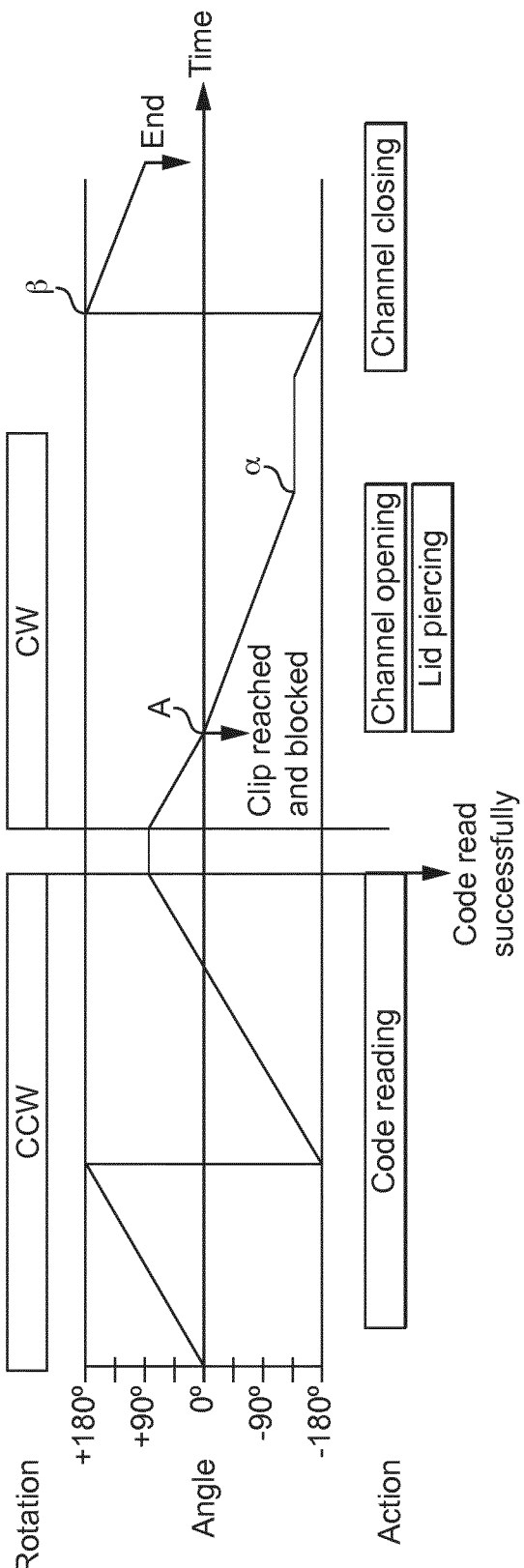
FIG. 9 shows a graph representing the angle of rotation of the two parts of the cap assembly according to an embodiment of the invention with time, in counter clockwise and in clockwise direction.

In a preferred embodiment of the invention, a sequence of operation of the movement of the container 20 and the cap assembly 10 and its parts 11, 12, is represented in the graph of FIG. 9: in the axis X it is represented time and, in the axis Y, it is represented the angle of rotation of the secondary part 12 of the cap, positive sign for counter clockwise rotation angle and negative sign for clockwise rotation angle. The sequence of movements represented in the graph of FIG. 9 corresponds to the following:

First, the secondary part 12 is turned in counter clockwise direction, entrained in rotation by the driving element 31 (typically, gears) in the machine: the design of the ramps and ramp followers in the parts of the cap assembly 10 is made in such a way that, in counter clockwise direction of rotation, the parts 11 and 12 cannot move with respect to each other but they are obliged to rotate together (typically, by the design of the ramp and the follower, the ramp presents a stop to the follower in counter clockwise direction, allowing sliding of the follower on the ramp in clockwise direction). As the container 20 is joined to the secondary part 12, it will also rotate together with the cap assembly 10, this time in counter clockwise direction. During this rotation, the identification means 22 on the container will travel in front of a reader or sensor 33 in the machine, so the parameters and information on the code will be retrieved by the machine for the preparation process. Typically, the design of the groove 115 is such that it cannot be engaged by the retention element 32 in the machine in counter clockwise direction of rotation, but only in clockwise direction. It is also clear that the groove and retention element can be made to engage or not in clockwise or counter clockwise direction, the invention remaining the same but only the direction of rotation changing.

Only once the code 22 has been successfully read (several turns can be made in the same counter clockwise direction so as to read the code correctly, in case that, for example, in previous turns it has not been well read) then, the direction of rotation is reversed to clockwise direction. The secondary part 12 still rotates together with the primary part 11 (not independently) up to a certain angle when the retention element 32 engages the groove 115 in the primary part, represented as point A in FIG. 9. When this happens, this is detected by a corresponding sensor in the machine, this sensor being linked for example to the retention element 32 or detecting a rising current in the driving motor driving the gears 31. This angle reached in point A is then defined as angle zero reference.

The secondary part 12 is kept turning in clockwise direction and it turns now independently to the primary part 11, engaged by the retention element 32: the secondary part 12 rotates up to a certain predefined angle α: the design of the cap assembly is made such that, when this angle α is reached, the apertures 110 and 120 coincide (so the channel 130 communicating with the inner volume of the container 20 is opened) and the lid 21 has been pierced by the piercing element 125 being forced downwards and rotated to open this lid. In fact, the aperture 120 appears once the piercing element 125 has been pushed downwards, therefore leaving free the communication to the inside of the volume of the container. Therefore, when this angle α is reached, the container (typically, the bottle) can be squeezed or pressed to deliver its content.

The secondary part 12 is kept turning in clockwise direction until a certain pre-defined angle β: this angle β ensures that the cap is closed (i.e. the channel 130 communicating with the inner volume of the container 20 is closed), so no remaining product in the container can be dispensed when the container is removed from the machine, typically for being dispensed.

According to another embodiment of the invention, a container system can be made by a pack or packaging comprising inside a food product to be dispensed, the container system can have any type of cap or lid through which the product will be dispensed. The container system will be provided with means able to engage with corresponding means in the machine so that the identification means in the pack will be able to travel according to a certain predefined path matching with reading means in the machine, so that the information on the identification means can be properly read and processed by the machine to prepare a corresponding food or beverage product. A possible execution can be for example the one described, with a container 20 comprising identification means 22: the container itself or a cap arranged over it can be provided with means to engage corresponding means in the machine (typically, gears 31) in order to make the container 20 move (typically rotate) and therefore make identification means 22 on it travel in front of a reader or sensor 33, so as to obtain the information of the product and/or the process in order to properly prepare the corresponding food product or beverage.

The described example and way of operation can be done clockwise or counter clockwise, or a combination of both, depending on the needs: the container system 40 will be designed accordingly.

As shown for example in FIG. 6, the cap assembly 10, typically the primary part 11, comprises an outlet 116 with the shape of a beak: this outlet can also be made having a preferred orientation or slope facilitating the dispensing of the product. In such case, the rotation reached by angle α will also ensure that the outlet 116 is oriented accordingly for dispensing, i.e. with the beak sloped towards dispensing.

For the lid piercing and channel opening functions, the relative rotation needed between the two parts of the cap assembly necessarily implies that when a part is being driven in rotation by the machine, the other part is maintained fixed, i.e. it is blocked in rotation. This blocking can either be done:
- constantly: by an element of the machine, for example a closing cover or similar, blocking the rotation all the time;
- occasionally: with two possibilities to block; actively, where the blocking is done at a selected moment, for example by an electromagnet or a stepper motor; passively, where the blocking is done by a mechanical element, such a flexible clip or a saw teeth profile for example.

Figure 10:
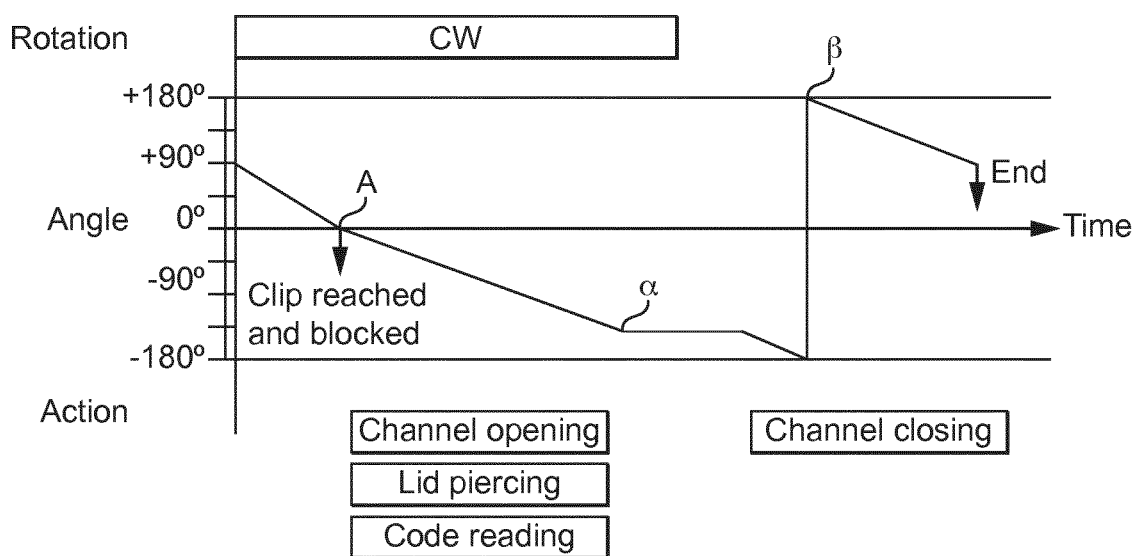
FIG. 10 shows a graph representing the angle of rotation of the two parts of the cap assembly according to anther embodiment of the invention with time, in clockwise direction.
Figure 11A:
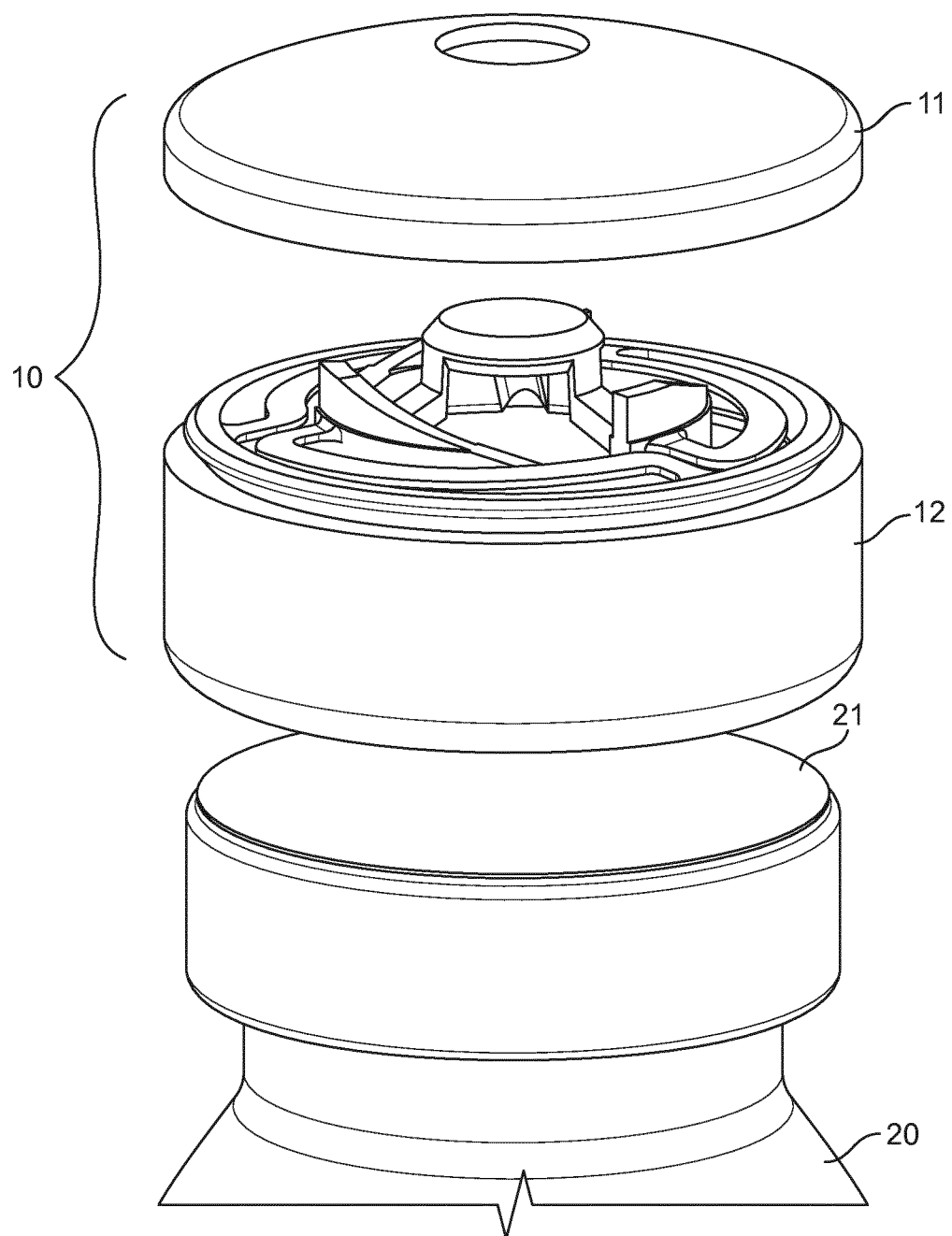
FIGS. 11a-e show different views of the parts configuring a cap assembly according to another embodiment of the present invention.
Figure 11B:
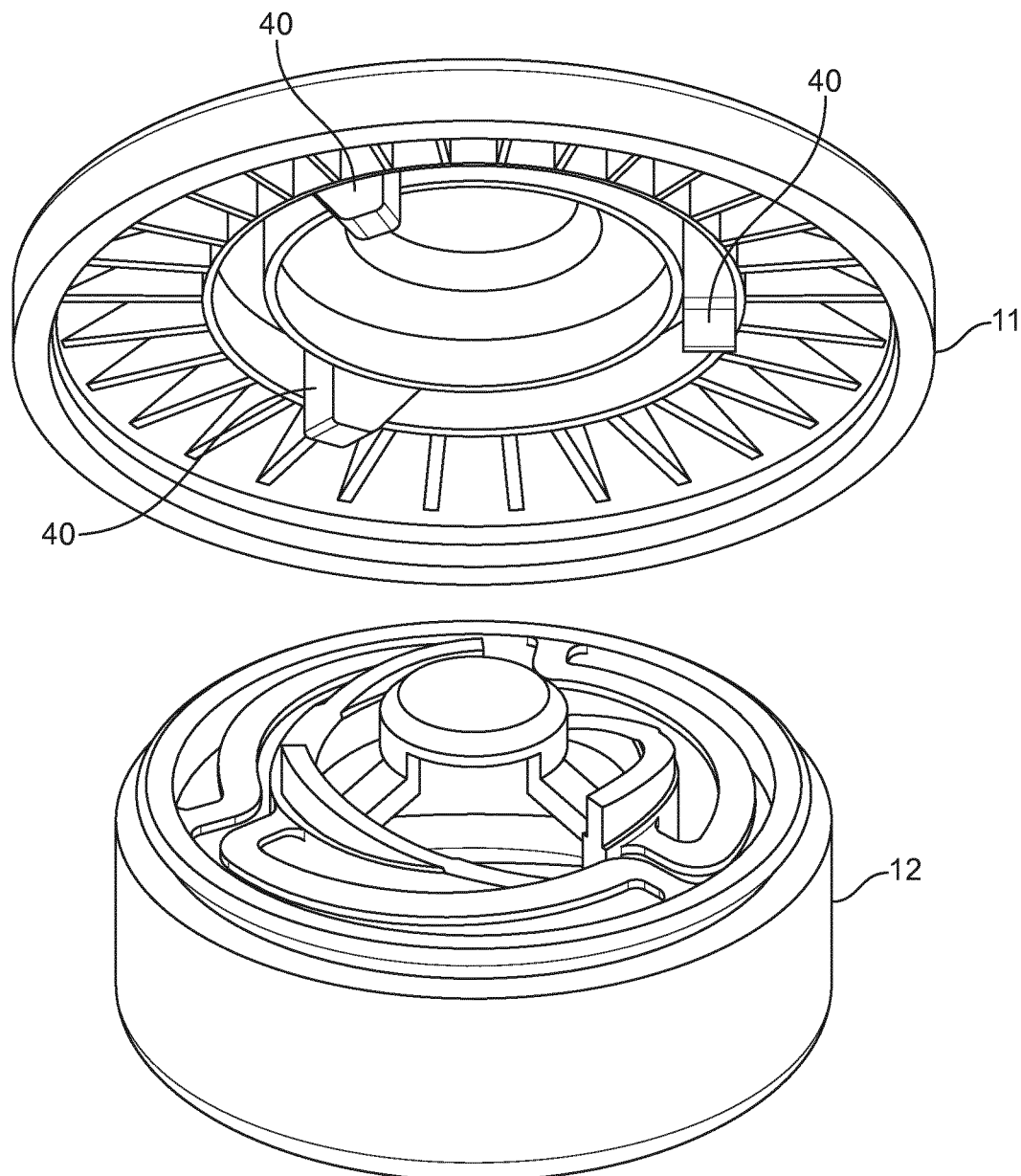
Figure 11C:
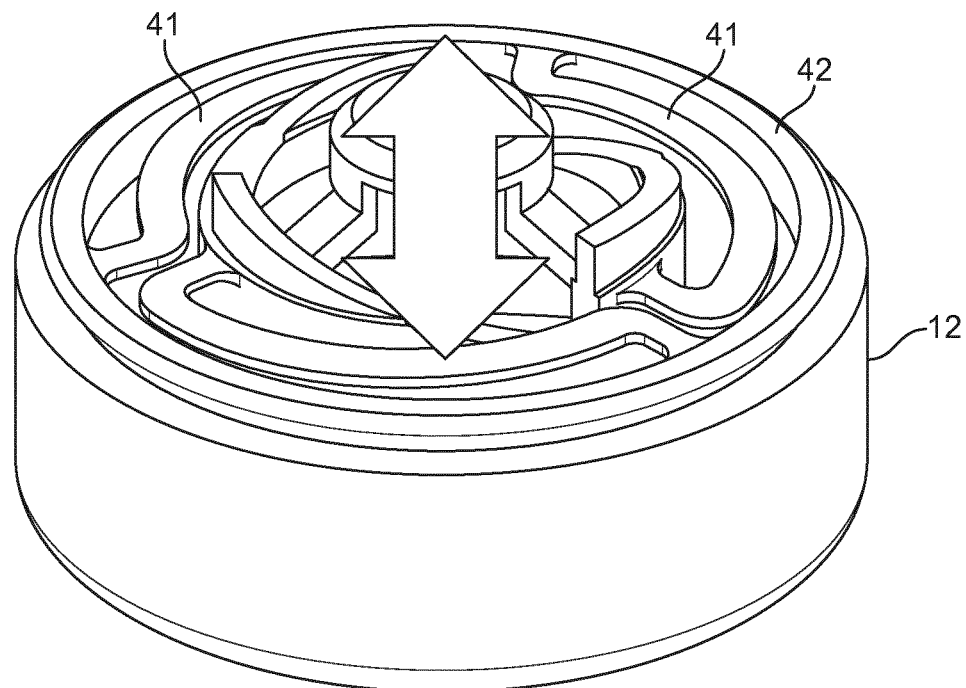
Figure 11D:
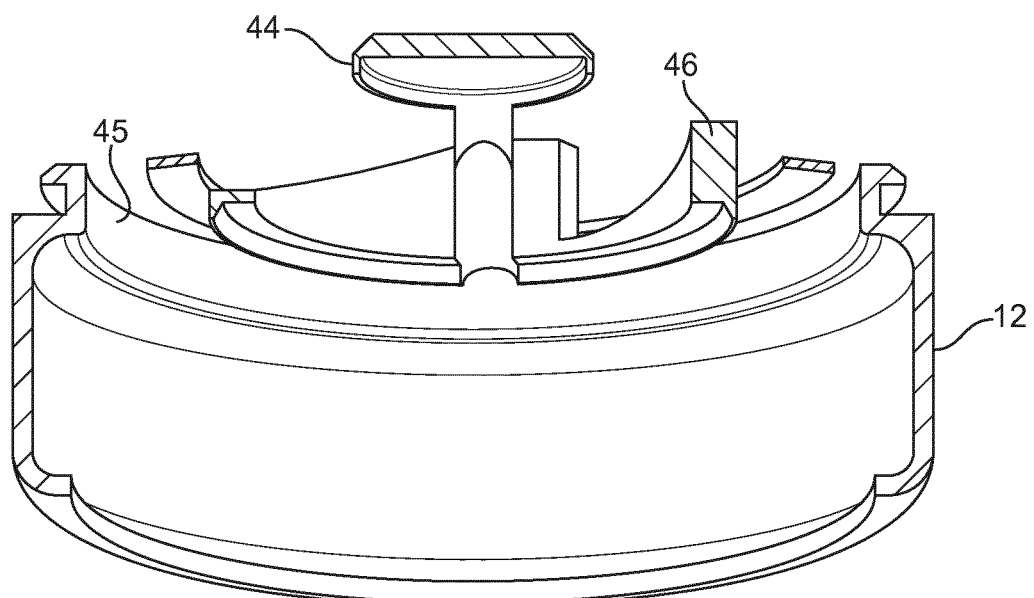
Figure 11E:
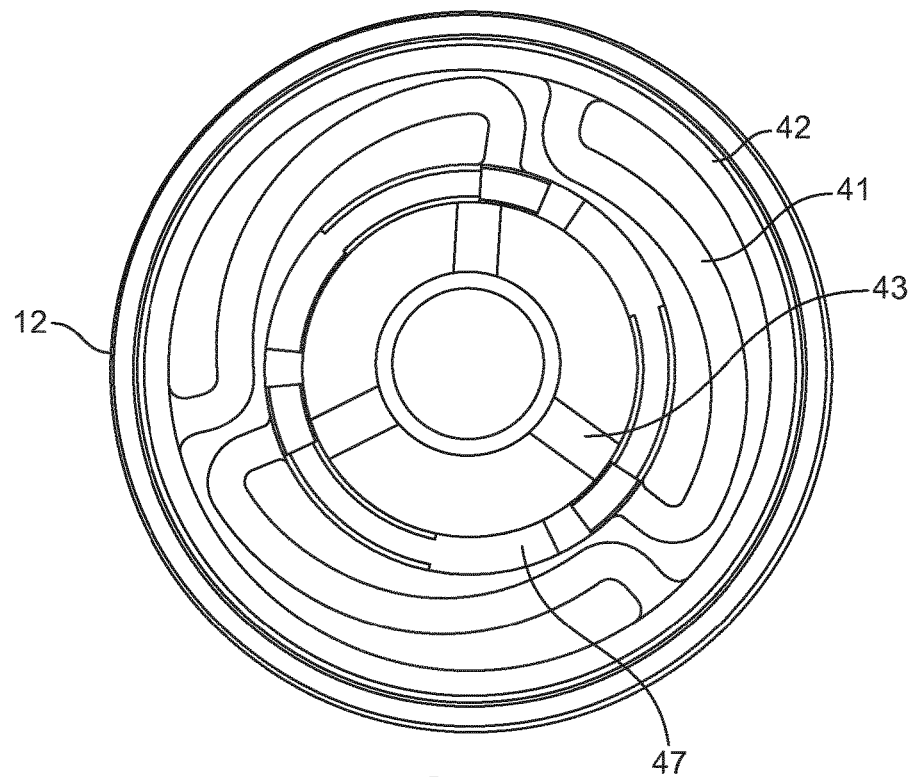

The sequence of operation presented in the graph of FIG. 9 is a preferred example, where code reading in the container is done before the lid is pierced and the channel is opened. However, other options or designs of the cap assembly are possible, to provide these actions in a different order, overlapped and/or simultaneously and/or sequentially; for example, FIG. 10 shows the case where the part of the cap to be blocked (typically, the primary part 11) is constantly blocked, and code reading, lid piercing and opening/closing of the channel is done simultaneously, all these functions being achieved with the cap rotating only in one direction.

The design presented is a preferred and possible one, but different other possibilities exist: a different mechanical design can also achieve the same functions, as for example the alternative design represented in FIGS. 11a-e, where:
- the upper primary part 11 is rigid and comprises pins 40;
- the lower secondary part 12 has a rigid contour 42 and a rigid internal part 43; a flexible part 47 can translate under a force, thanks to flexible arms 41.

When rotating one part relative to the other (upper primary part 11 and lower secondary part 12), the pins 40 of the primary part 11 travel on ramps 46 of the secondary part 12, pressing and inducing a vertical force that moves down the flexible part 47 of the secondary part 12 of the cap. This has two consequences:
- the channel 130 is opened (typically, a closure 44 is made open);
- cutters 45, present on the side of the flexible part 47 facing the lid 21 on the container, pierce this lid.

The cap assembly can be done in any kind of material, but it is preferably made of polymers such as Polypropylene (PP) or Polyethylene (PE).

The cap assembly of the invention is designed in such a way to avoid that it can be opened when not in the machine: for this reason, the design of the cap is made such that the torque required to open the cap is significantly higher than the torque that can be reasonably given by a consumer during normal manipulation. This avoids accidental openings whenever the container and its cap assembly are not correctly placed in the preparation machine.

This can be achieved through different methods, such as for example:
- by adding one or several bridges of material, linking both parts of the cap assembly, that have to be broken during the opening, as it is done for several existing beverage caps;
- by adding on one part of the cap a flexible element that will have to overcome a mechanical obstacle placed on the other part of the cap; overcoming this obstacle will only be possible under a certain force or torque.

Figure 12:
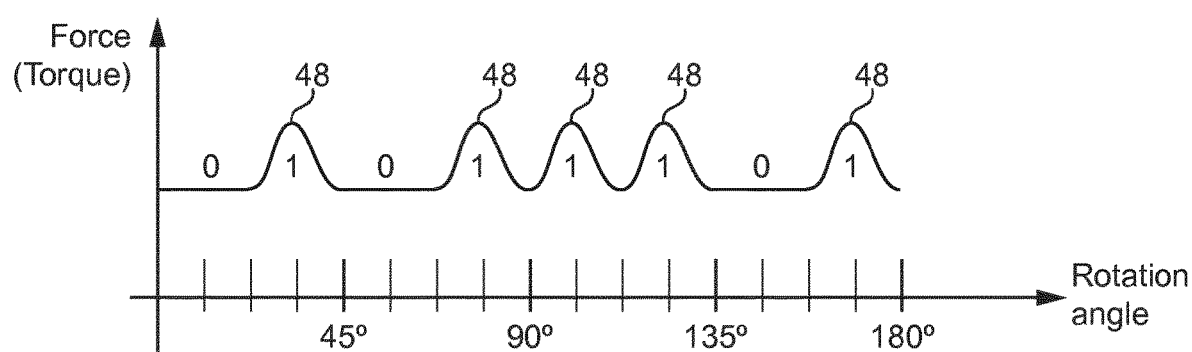
FIG. 12 shows a graph representing the angle of rotation of the two parts of the cap assembly according to the embodiment shown in FIGS. 11a-e.
Figure 13:
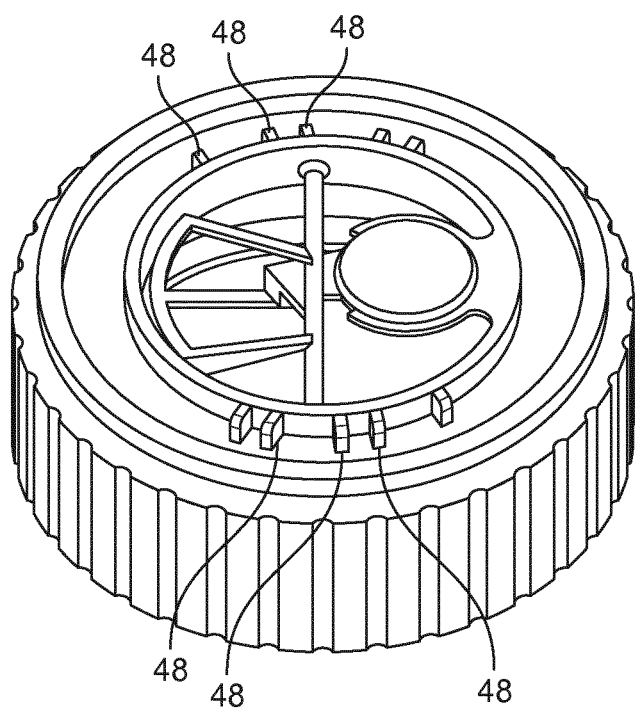
FIG. 13 shows the configuration of the secondary part of a cap assembly according to the embodiment shown in FIGS. 11a-e, comprising further elements to configure a digital code.
Figure 14A:
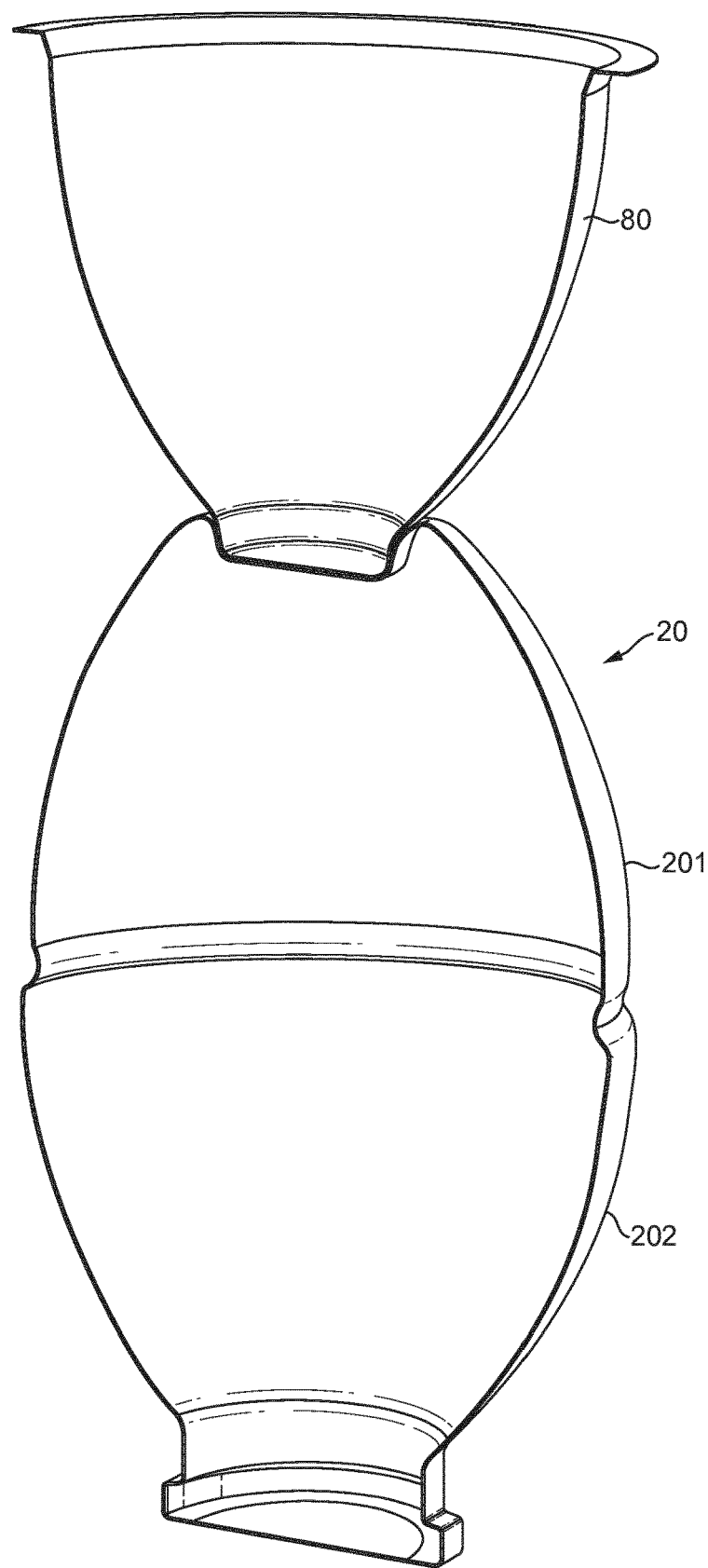
FIGS. 14a-d show actuation means pressing a container in a container system according to the pressing invention in order to expel and deliver the content of it.
Figure 14B:
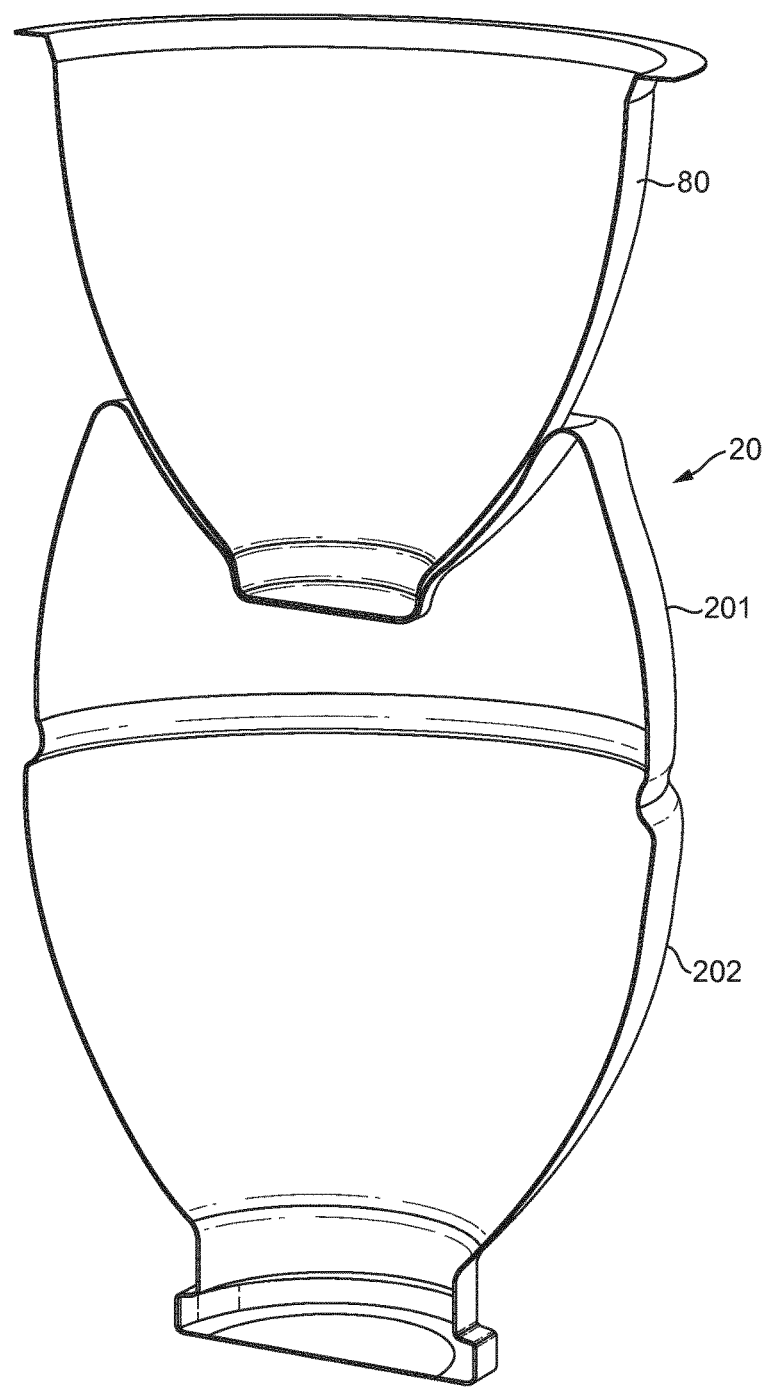
Figure 14C:
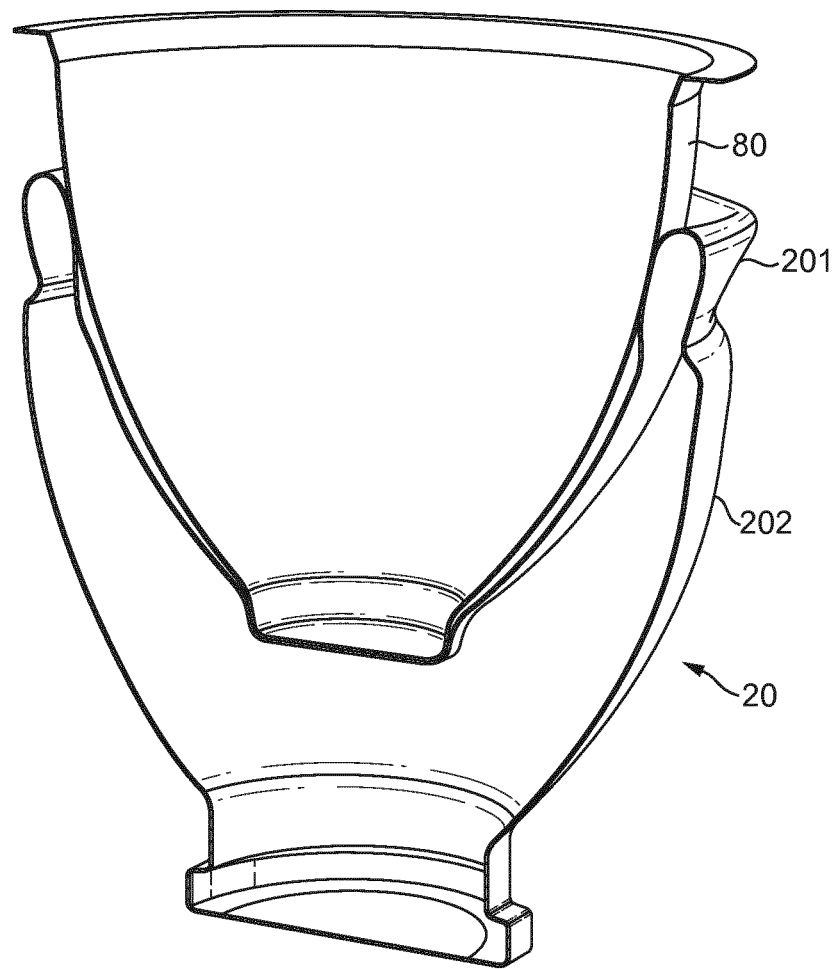
Figure 14D:
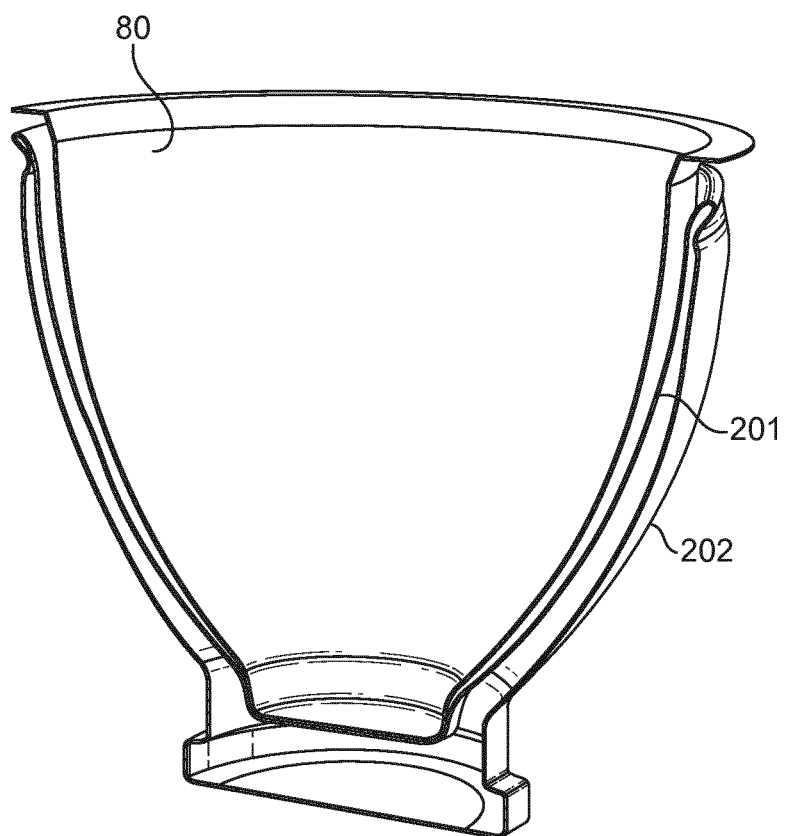

As already explained, elements such as a bridge of material, or a flexible element overcoming the obstacle, will require a certain torque to rotate relative to each other: this torque is almost linear to the current required by the motor, and this current is a physical value that is easy to measure; hence, this principle can be used to constitute a digital code (additional to the identification means or printed code 22 discussed before) that would be composed of 0 and 1, corresponding to the absence or the presence of an obstacle to overcome, at defined locations, as represented by references 48 in FIG. 13. The force (torque values, 0 and 1) in half a rotation of 180° of the two parts of the cap relative to each other, is represented on FIG. 12.

The cap assembly and the full container system in the present invention allow the dispensing of a product contained in a fully sterile container sealed by a lid, to allow the further preparation of fresh single portioned desserts, in a reduced time (typically below 5 minutes) and without requiring any cleaning operation.

The most important feature of the cap assembly of the present invention is that three functions (opening/closing a channel, piercing a lid and reading a code) can be achieved by a single rotation provided of one part of the cap with respect to the other. The design can also be made in such a way that only one or a plurality of functions can be achieved. Moreover, a further code can be provided with further information or parametrization of the process or the container ingredients.

In the present application, the container comprises a fluid that is going to be processed in order to provide a cold or frozen dessert product. The term "fluid" refers to a flowable substance, essentially to liquid or viscous paste or gel, or a mixture of any one of liquid, viscous, paste, gel, with gas inclusion and/or discrete solid pieces, particles, granules, beads, chips and the like. The fluid can be foodstuff such as a dairy or beverage liquid composition or ice cream mix.

The invention further relates to a system for preparing cold or frozen dessert products from a fluid comprised in a container 20. The system comprises a preparation machine or device and a container system 40, the container system comprising a container 20 and a cap assembly 10.

The preparation machine or device is provided with a driving element 31, typically gears, able to engage the cap assembly 10 and rotate the two parts relative to each other, to provide the functions of opening/closing of the outlet, piercing of the lid and code reading. Besides, the machine will be provided with a retention element 32 that will engage a corresponding element on the cap, typically on the secondary part 12, allowing the relative rotation of the two parts of the cap assembly.

The machine further comprises a sensor 33 to read the identification means 22 typically arranged on the container 20.

The machine will further comprise an actuation device that will compress the container in order to deliver the fluid in it for its further preparation. Typically, the container 20 will be shaped as a bottle, having a collapsible part that will compress so as to effect this delivery. Thus, the system will be provided with a mechanical actuation device 80, preferably a piston, configured to apply a pressure on the collapsible part 202 of the container 100 substantially parallel to the container longitudinal axis in order to allow dispensing of the fluid inside. Typically, the mechanical actuation device 80 is dimensioned and shaped as the inner shape of the retaining part 201 of the container and complementarily to the collapsible part 202 so as to engage it and invert it into the inner shape of the retaining part 201. Preferably, the mechanical actuation device 80 is configured to be able to dispense the content of containers having different sizes, collapsing the collapsible part 202 over the retaining part 201. FIGS. 14a-d show this actuation device 80 and the way it works compressing a container 20 configured partially collapsible, as described: the Figures show different steps of such compression.

Preferably, the container 20 has a volume of between 5 ml to 250 ml. The container can have a volume of 10 ml, 25 ml, 50 ml, 75 ml, 100 ml, 125 ml, 150 ml, 175 ml, 200 ml, 225 ml. The dimensions such as radius and height of the body determine the volume of the container, these two parameters being modified depending on the intended shape and use of the container.

Although the present invention has been described with reference to preferred embodiments thereof, many modifications and alternations may be made by a person having ordinary skill in the art without departing from the scope of this invention which is defined by the appended claims.

The invention claimed is:

1. A cap assembly used in a container, the container comprising a food product in an inner volume of the container, the container configured to dispense the food product from the inner volume of the container, the inner volume of the container is closed by a lid:
   wherein identification means are arranged on at least one of the cap assembly or a surface of the container,
   wherein the cap assembly comprises two parts configured to move in a solidary movement when the two parts move in one direction and to move independently to each other in a relative movement when the two parts move in a reverse direction, such that the relative movement and/or the solidary movement of the two parts allow displacement of the identification means according to a certain path and allow opening and/or closing a communication between the cap assembly and the inner volume of the container.

2. The cap assembly according to claim 1, wherein the cap assembly is configured such that the relative movement and/or the solidary movement of the two parts further allows opening of the lid.

3. The cap assembly according to claim 2, wherein the cap assembly is configured such that the opening of the lid is done by peeling, piercing and/or tearing of the lid.

4. The cap assembly according to claim 1, wherein the two parts are rotatable with respect to each other.

5. The cap assembly according to claim 1, wherein one of the two parts comprises a piercing element having a sharp profile, the sharp profile designed to be pressed towards the lid by the relative movement of the two parts, in order to pierce and open the lid.

6. The cap assembly according to claim 1, wherein the two parts comprise one or a plurality of matching ramps and ramp followers, the one or plurality of matching ramps and ramp followers designed to dictate a path followed by the two parts during the relative movement with respect to each other.

7. The cap assembly according to claim 6, further comprising a piercing element, wherein the cap assembly is configured such that the relative movement of the two parts on the path dictated and followed by the two parts presses the piercing element onto the lid and/or guides the piercing element to tear open the lid.

8. The cap assembly according to claim 1, further comprising an outlet through which the food product in the container is dispensed, the outlet having a certain orientation facilitating the dispensing of the food product, the relative movement of the two parts being designed such that, when the communication between the cap assembly and the inner volume of the container is opened, the outlet is oriented for facilitating the dispensing of the food product.

9. A cap assembly according to claim 1, used in a container, the container comprising a food product in an inner volume of the container, the container configured to dispense the food product from the inner volume of the container, the inner volume of the container is closed by a lid:
wherein identification means are arranged on at least one of the cap assembly or a surface of the container,
wherein the cap assembly comprises two parts relatively moveable with respect to each other in a relative movement, such that the relative movement of the two parts and/or a solidary movement of the two parts allow displacement of the identification means according to a certain path and allow opening and/or closing a communication between the cap assembly and the inner volume of the container,
wherein the cap assembly further comprises an additional identification member provided by one or a plurality of obstacles in the relative movement of the two parts, wherein the additional identification member is configured such that torque is required to move the two parts to overcome the one or plurality of obstacles.

10. The cap assembly according to claim 9, wherein the element of the cap assembly is designed such that movement of the cap assembly in a first direction allows engagement of the element of the cap assembly with the external retention element and movement of the cap assembly in a second direction which is reverse to the first direction maintains disengagement of the element of the cap assembly from the external retention element.

11. The cap assembly according to claim 9, wherein the cap assembly is configured such that engagement of the cap assembly to the container is performed constantly by the external retention element.

12. The cap assembly according to claim 9, wherein the cap assembly is configured such that engagement of the cap assembly to the container is performed by an active blocking at selected times.

13. The cap assembly according to claim 9, wherein the cap assembly is configured such that engagement of the cap assembly to the container is performed passively by a mechanical element.

14. A cap assembly used in a container, the container comprising a food product in an inner volume of the container, the container configured to dispense the food product from the inner volume of the container, the inner volume of the container is closed by a lid:
wherein identification means are arranged on at least one of the cap assembly or a surface of the container,
wherein the cap assembly comprises two parts relatively moveable with respect to each other in a relative movement, such that the relative movement of the two parts and/or a solidary movement of the two parts allow displacement of the identification means according to a certain path and allow opening and/or closing a communication between the cap assembly and the inner volume of the container,
the cap assembly further comprising an element designed to engage with an external retention element to thereby allow the relative movement of the two parts of the cap assembly with respect to each other.

15. A container system comprising:
a container comprising a food product inside an inner volume of the container;
a lid closing the inner volume of the container;
a cap assembly configured for the food product to be dispensed from the container through the cap assembly; and
identification means arranged on at least one of the cap assembly or a surface of the container,
wherein the cap assembly comprises two parts configured to move in a solidary movement when the two parts move in one direction and to move independently to each other in a relative movement while the two parts move in a reverse direction, such that the relative movement and/or the solidary movement of the two parts allow displacement of the identification means according to a certain path and allow opening and/or closing a communication between the cap assembly and the inner volume of the container.

16. The container system according to claim 15, wherein the container is designed being at least partially collapsible, allowing dispensing of the product through the cap assembly when the container is pressed.

* * * * *